US011222306B2

(12) United States Patent
Sun et al.

(10) Patent No.: US 11,222,306 B2
(45) Date of Patent: Jan. 11, 2022

(54) MERCHANDISE INVENTORY DATA COLLECTION FOR SHELF SYSTEMS USING LIGHT SENSORS

(71) Applicants: Yeyang Sun, Westport, CT (US); Jiayu Sun, Westport, CT (US)

(72) Inventors: Yeyang Sun, Westport, CT (US); Jiayu Sun, Westport, CT (US)

(*) Notice: Subject to any disclaimer, the term of this patent is extended or adjusted under 35 U.S.C. 154(b) by 423 days.

(21) Appl. No.: 15/418,307

(22) Filed: Jan. 27, 2017

(65) Prior Publication Data

US 2017/0220987 A1 Aug. 3, 2017

Related U.S. Application Data

(60) Provisional application No. 62/288,477, filed on Jan. 29, 2016.

(51) Int. Cl.
*G06Q 10/08* (2012.01)
*A47F 1/12* (2006.01)
(Continued)

(52) U.S. Cl.
CPC ........... *G06Q 10/087* (2013.01); *A47F 1/126* (2013.01); *A47F 5/0869* (2013.01); *A47F 10/02* (2013.01);
(Continued)

(58) Field of Classification Search
CPC .. G06Q 10/087; G06Q 10/08; G06Q 10/0875; G06Q 10/083; G06Q 20/203; A47F 1/126; A47F 5/0869
(Continued)

(56) References Cited

U.S. PATENT DOCUMENTS 5,703,785 A * 12/1997 Bluemel ............. G06Q 10/087
235/383
8,040,426 B2 * 10/2011 Zhou ....................... G03B 3/10
348/345

(Continued)

FOREIGN PATENT DOCUMENTS

JP 06189842 7/1994
JP 11-187955 7/1999
(Continued)

OTHER PUBLICATIONS

The Store Of The Future. Daily Tribune; Manama [Manama], Jun. 23, 2013. (Year: 2013).*

(Continued)

*Primary Examiner* — Dennis W Ruhl
*Assistant Examiner* — Fawaad Haider
(74) *Attorney, Agent, or Firm* — Ohlandt, Greeley, Ruggiero & Perle, L.L.P.

(57) ABSTRACT

Disclosed is a system for real-time measurement of inventory on shelves. The system uses light sensors placed in association with the inventory and the shelves to measure in real-time the removal/replacement of inventory from the shelves. When inventory is on the shelves, less light reaches the light sensors. As inventory is removed from shelves, the light sensors receive more light. The difference in light received generates as signal that can be measured, thereby allowing for determining inventory levels on each shelf. The system may be retro-fitted to existing shelving systems, thereby avoiding the cost of purchasing new shelving systems. The system can work on any shelving system, including gravity-feed roller shelf (GRS), flat shelves, and spring loaded pusher shelves, and is unaffected by usual temperatures found in retail establishments and can thus work in (Continued)

both refrigerated and unrefrigerated systems. Also disclosed are related methods.

35 Claims, 26 Drawing Sheets

(51) Int. Cl.
| | |
|---|---|
| *A47F 5/08* | (2006.01) |
| *A47F 10/02* | (2006.01) |
| *G06Q 20/20* | (2012.01) |
| *A47B 96/14* | (2006.01) |
| *A47F 5/00* | (2006.01) |
| *A47B 96/06* | (2006.01) |
| *A47F 3/04* | (2006.01) |
| *A47F 11/10* | (2006.01) |

(52) U.S. Cl.
CPC ........... *G06Q 10/08* (2013.01); *G06Q 10/083* (2013.01); *G06Q 10/0875* (2013.01); *G06Q 20/203* (2013.01); *A47B 96/061* (2013.01); *A47B 96/1408* (2013.01); *A47F 3/04* (2013.01); *A47F 5/005* (2013.01); *A47F 11/10* (2013.01); *A47F 2010/025* (2013.01)

(58) Field of Classification Search
USPC .......................................................... 705/28
See application file for complete search history.

(56) References Cited

U.S. PATENT DOCUMENTS

| | | | | |
|---|---|---|---|---|
| 2003/0174099 A1* | 9/2003 | Bauer | ................... | G06K 7/0008 343/893 |
| 2005/0190072 A1* | 9/2005 | Brown | .................... | G07F 9/026 340/6.1 |
| 2006/0001147 A1 | 1/2006 | Tomita et al. | | |
| 2007/0057215 A1* | 3/2007 | Parsons | ..................... | E03C 1/05 251/129.04 |
| 2007/0069867 A1 | 3/2007 | Fleisch et al. | | |
| 2010/0169190 A1* | 7/2010 | Allison | ................ | G06Q 10/087 705/28 |
| 2014/0114708 A1* | 4/2014 | Campbell | .......... | G06Q 30/0201 705/7.11 |
| 2014/0278445 A1* | 9/2014 | Eddington, Jr. | ........ | G10L 19/26 704/275 |
| 2014/0316916 A1* | 10/2014 | Hay | ....................... | G06Q 20/20 705/17 |
| 2016/0134930 A1* | 5/2016 | Swafford | .............. | A47F 5/0068 725/80 |

FOREIGN PATENT DOCUMENTS

| | | |
|---|---|---|
| JP | 2006-019428 | 1/2006 |
| JP | 2006-321624 | 11/2006 |
| WO | 2015/072859 A1 | 5/2015 |

OTHER PUBLICATIONS

Notification of Transmittal of International Preliminary Report on Patentability dated May 10, 2018 from corresponding International PCT Application PCT/US2017/015402, 28 pages.
International Search Report dated Apr. 17, 2017 from corresponding International PCT Application No. PCT/US2017/015402, 3 pages.
Written Opinion dated Apr. 17, 2017 from corresponding International PCT Application No. PCT/US2017/015402, 11 pages.
Extended European Search Report dated Sep. 3, 2019 in corresponding European Patent Application No. 17744996.4, 10 pages.
Japanese Office Action dated Sep. 10, 2019 in corresponding Japanese Patent Application No. 2018-559161, 8 pages.

\* cited by examiner

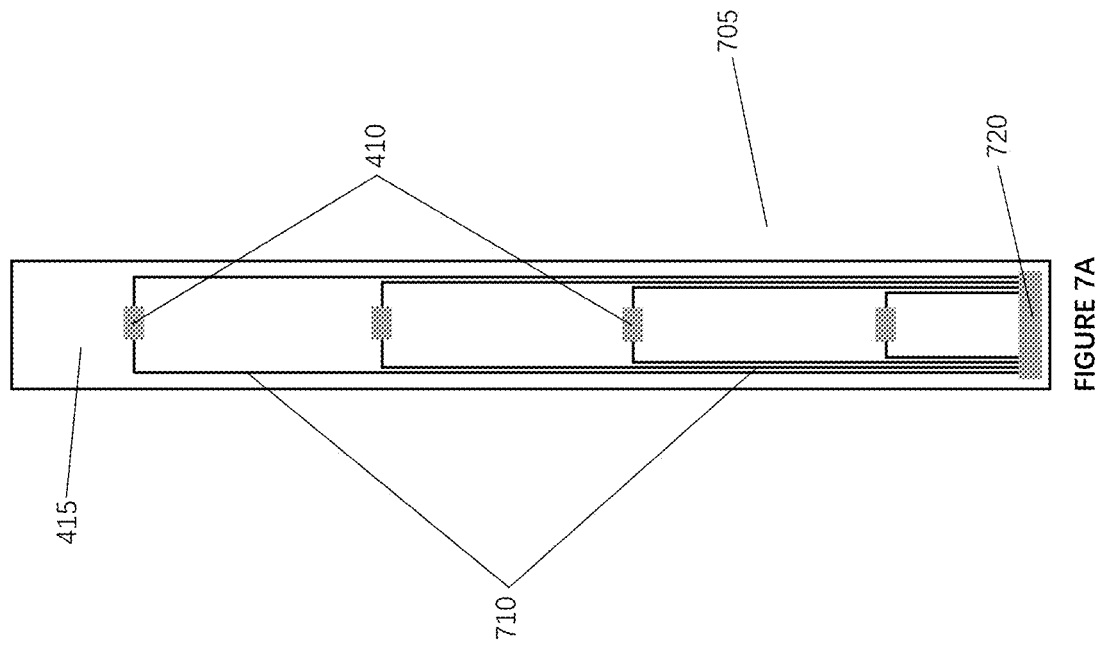

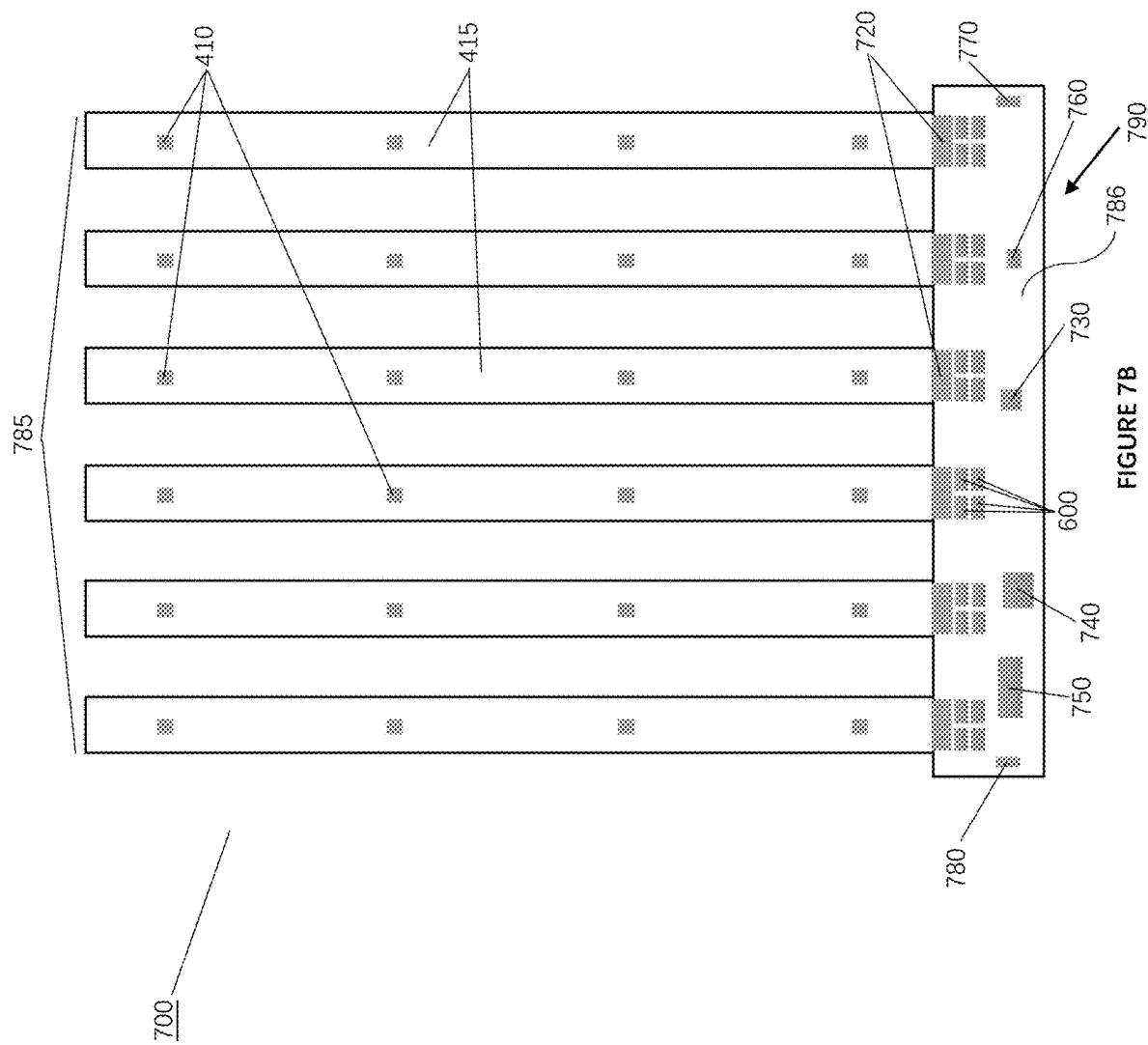

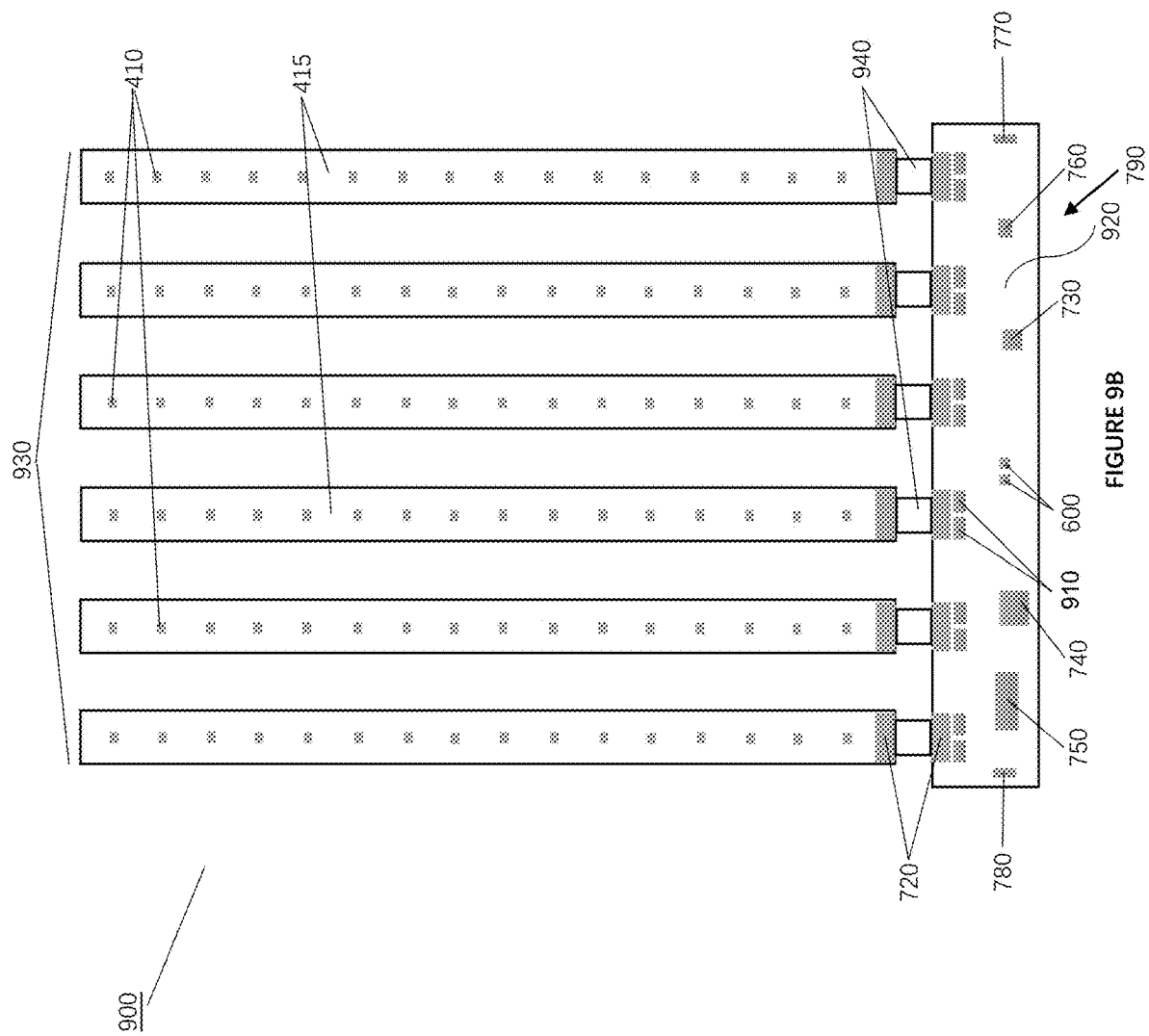

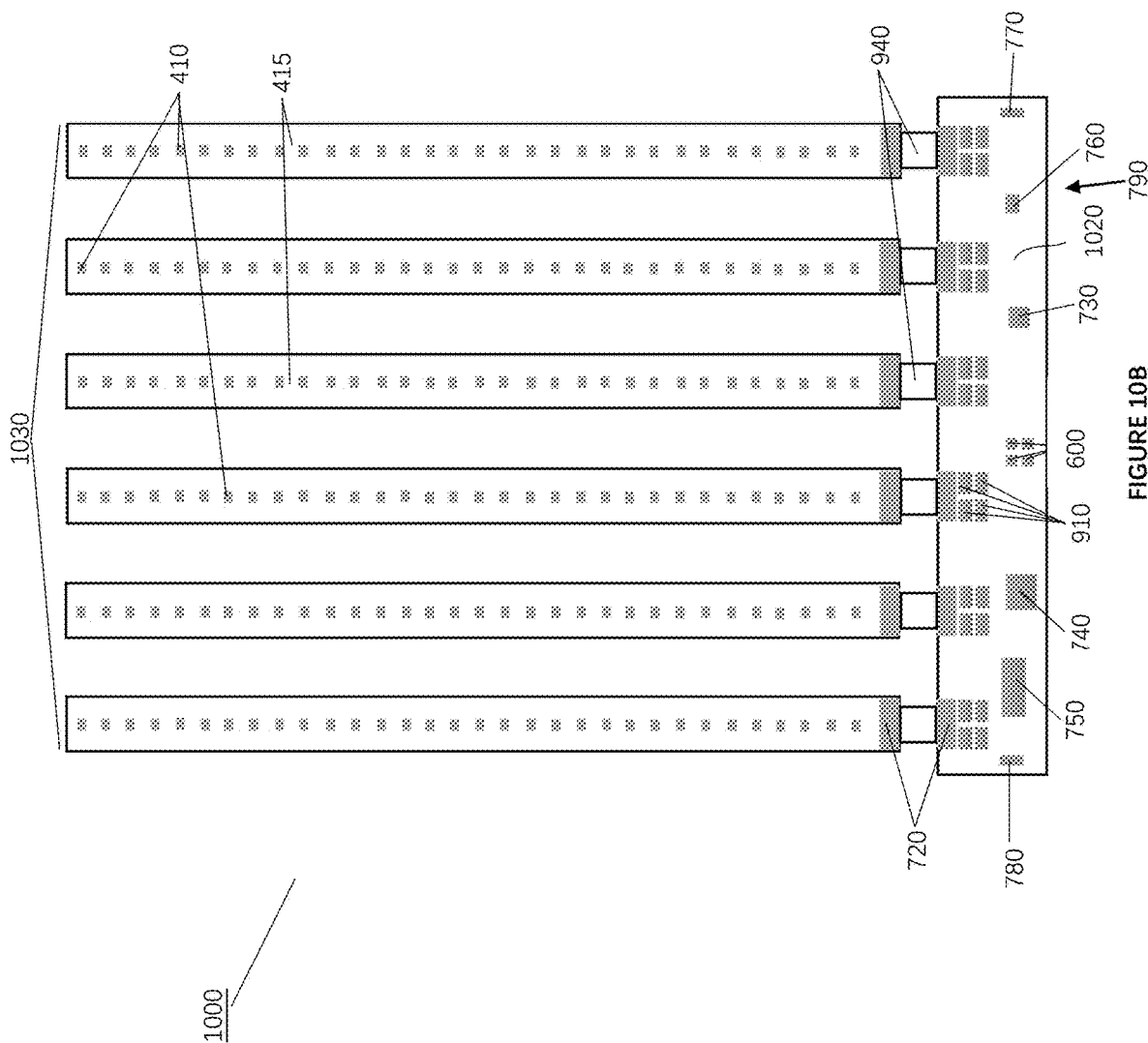

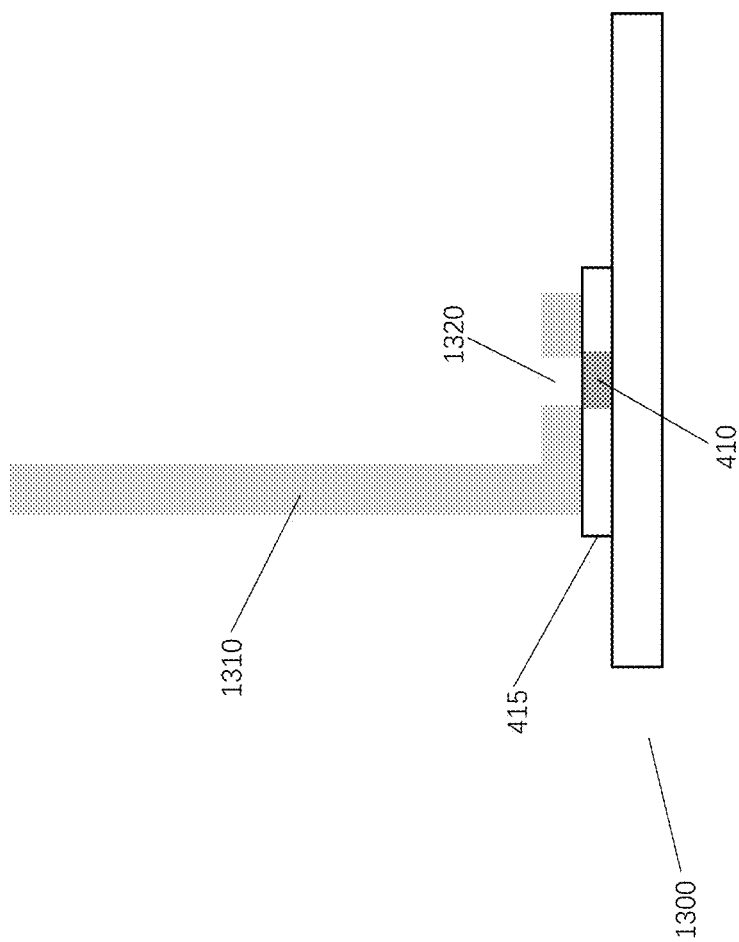

MERCHANDISE INVENTORY DATA COLLECTION FOR SHELF SYSTEMS USING LIGHT SENSORS

CROSS-REFERENCED APPLICATION

This application is related, and claims priority, to U.S. Provisional Application No. 62/288,477, filed on Jan. 29, 2016, that is incorporated herein in its entirety by reference thereto.

BACKGROUND

1. Field of the Disclosure

The present disclosure relates generally to a system for real-time measurement of inventory on shelves. More particularly, the present disclosure relates to a system that uses light sensors placed in association with the shelves, where the light sensors measure the real-time removal/replacement of inventory from the shelves. The system may be retrofitted to existing shelving systems, thereby avoiding the cost of purchasing new shelving systems. The system can work on any shelving system, including, without limitation, gravity-feed roller shelf (GRS), flat shelves, and spring loaded pusher shelves. The system is unaffected by the temperatures generally found in retail environments and can thus work in both refrigerated and unrefrigerated systems.

2. Description of Related Art

Retail businesses need to know the amount of merchandise that is actually available on their shelves. This information allows retail businesses to replenish their shelves with additional merchandise, and can also be used to indicate missing products. Without this information, retail businesses could lose sales simply because some of its shelves are empty or inadequately stocked.

Currently, information about "real-time" shelf inventory is generally gathered through (a) visual inspection/scans by employees and/or (b) data from point-of-sale (POS) cash registers. However, information from visual inspections/scans may be inadequate or untimely, especially if the retail business is very large and contains hundreds of shelves. This is so because by the time the visual inspections/scans are completed, the actual inventory situation may have changed. And it is recognized and accepted in the retail industry that there is on average up to about a 25% disparity between POS data and actual inventory on shelves. That is to say, there could be a 25% disparity—known as "shrinkage"—in how much inventory actually is on the store's shelves and how much inventory the store's sales numbers suggest is on the store shelves. This "shrinkage" is typically the result of stolen, misplaced, missing, unreturned, or damaged merchandise. POS cash registers cannot account for such off-the-shelf merchandise because no purchase has been registered at the POS.

The "shrinkage" problem causes significant loss of sales and profits in the retail industry, as well as delays in the ordering and supply of merchandise replenishments. In the case of fast-turnover merchandise, such as refrigerated sodas and other bottled beverages, as well as certain high-value merchandise that is only stocked in limited quantities inside a retail store, real-time data of the availability of the actual merchandise available on store shelves is critical.

Previous attempts to capture real-time inventory data have included the use of RFID tags on merchandise and weight sensors on the shelves. However, RFID technology requires the placement of RFID tags on each product, which is not a practical solution for low-margin items such as bottled beverages. Weight sensors have also been used, but weight sensors do not easily measure merchandise quantity having differing weights and sizes on a shelf, or merchandise that is very light weight. Attempts have also been made to use ultrasonic devices; however, ultrasonic devices take up too much space at the back of and/or beneath the shelves. Finally, infrared sensors have been considered, but infrared sensors are restricted when used in open spaces, in that they can be harmful to the human eye. Furthermore, all of these technological options are relatively expensive when compared to the cost of the merchandise on most retail shelves.

Thus, a need exists for a real-time inventory system that is cost-effective even for low-margin products, is accurate regardless of the size/weight of the merchandise and, ideally, is part of the shelving system itself and independent of the type of merchandise on the shelves. Preferably, the real-time inventory system can be retrofitted to existing shelving systems, thus avoiding the cost of purchasing new shelving.

SUMMARY

It has now been determined that the use of lights sensors, placed in association with the shelves holding merchandise, can provide inventory measurement that is accomplished in real-time and is accurate.

In contrast to other technologies, the use of light sensors provides a superior method of obtaining real-time shelf inventory data in terms of accuracy, practicality, and affordability. Such light sensors can be used to detect the presence or absence of goods on a shelf and can be added to—or embedded within—most types of shelves to efficiently gather inventory data on most merchandise types with 95% to 100% accuracy. The light sensors can also be retrofitted onto existing shelving systems, so that a business does not have to purchase an entirely new shelving unit.

In addition, a bar code scanner capability can be added to a shelving system that employs such light sensors to identify the exact type of product on a shelf and its real-time availability. Cameras and image recognition software may also be used in conjunction with the light sensors to offer an even more complete and precise data picture of the availability of merchandise on a retail shelf.

All of this inventory data can be combined with traditional visual inspection/scans and POS information to provide retail businesses with the most complete and up-to-date data picture of what merchandise is actually available in their stores and on their shelves. Furthermore, these combined real-time data sets can be used to measure the effectiveness of in-store advertising to a degree that mere POS information cannot.

In one embodiment, the present disclosure provides a system for the real-time measurement of inventory. The system comprises: a shelf configured to have inventory disposed thereon; and a plurality of light sensors disposed beneath or adjacent said inventory, wherein, when inventory is on the shelf, a first amount of light is received by at least one light sensor, wherein, when inventory is removed from the shelf, a second amount of light is received by the at least one light sensor, wherein a difference between the first amount of light and the second amount of light causes the at least one light sensor to generate a signal, and wherein the signal provides an indication of said inventory on the shelf.

The plurality of light sensors is preferably between about 4 and about 32, although any number may be used. The plurality of light sensors is preferably disposed at a substantially equal distance from one another. Alternatively, each of the plurality of light sensors may be disposed at a random distance from one another. Also preferably, the plurality of light sensors is more closely spaced near a front of the shelf than near a rear of the shelf.

The signal is preferably an analog electric signal. Preferably, the electric signal is selected from electric resistance, electric current, electric voltage, or combinations of them. Also preferably, the analog signal is converted to a digital signal. The digital signal can be in a base numbering system selected from the group consisting of binary, hexadecimal, octal, decimal or any combinations thereof. Once obtained, the digital signal is preferably converted to a wireless signal. Also, the digital signal may be stored in a reader. Also preferably, the wireless signal may be communicated to a server by a method selected from the group consisting of WiFi, cable, power line or any combinations thereof.

The system preferably further comprises a protective element disposed in association with the plurality of light sensors. The protective element is preferably made of a material that allows light to pass therethrough and is thus either translucent or transparent, and more preferably the protective element is made of plastic or glass. Most preferably, each light sensor is provided with a protective element.

The plurality of light sensors is preferably a plurality of photoresistor light sensors (PLSs). The system may also further comprise a printed circuit board (PCB), wherein the plurality of PLSs is disposed on the PCB in a position selected from the group consisting of embedded in the PCB, on a top side of the PCB, on a bottom side of the PCB, on a lateral side of the PCB, or any combinations thereof. In a more preferred embodiment, the plurality of PLSs is disposed on a top side of the PCB. The PCB is of a linear or curved shape. The PCB may be of a thickness of from about 0.5 mm or less to 10 mm. Preferably, the PCB is from about 0.5 to about 10 mm, more preferably from about 1.0 mm to about 10 mm, and still more preferably from about 1.0 mm to about 5.0 mm and most preferably from about 1.0 to about 2.0 mm. Also, the PCB may be rigid or flexible and, preferably, is flexible.

The shelf is preferably part of a shelving system selected from the group consisting of spring pusher systems, gravity-feed roller shelf systems, gravity-feed gliding systems, static/flat shelf systems, grid systems and rack systems.

Another embodiment of the present disclosure provides a method for real-time measurement of inventory. The method comprises: (a) providing a shelf configured hold inventory disposed thereon; (b) disposing a plurality of light sensors beneath or adjacent said inventory; (c) receiving, by at least one light sensor, a first amount of light and a second amount of light, wherein the first amount is received when inventory is on the shelf, wherein the second amount of light is received when inventory is not on the shelf, and wherein a difference between the first amount of light and the second amount of light causes the at least one light sensor to generate a signal; and (d) determining inventory remaining on the shelf using the signal that is generated.

The plurality of light sensors is preferably between about 4 and about 32, although any number may be used. The plurality of light sensors is preferably disposed at a substantially equal distance from one another. Alternatively, each of the plurality of light sensors may be disposed at a random distance from one another. Also preferably, the plurality of light sensors is more closely spaced near a front of the shelf than near a rear of the shelf.

The signal is preferably an analog electric signal. Preferably, the electric signal is selected from electric resistance, electric current, electric voltage, or combinations of them. Also preferably, the analog signal is converted to a digital signal. The digital signal can be in a base numbering system selected from the group consisting of binary, hexadecimal, octal, decimal or any combinations thereof. Once obtained, the digital signal is preferably converted to a wireless signal. Also, the digital signal may be stored in a reader. Also preferably, the wireless signal may be communicated to a server by a method selected from the group consisting of WiFi, cable, power line or any combinations thereof.

The method preferably further comprises a protective element disposed in association with the plurality of light sensors. The protective element is preferably made of a material that allows light to pass therethrough and is thus either translucent or transparent, and more preferably the protective element is made of plastic or glass. Most preferably, each light sensor is provided with a protective element.

The plurality of light sensors is preferably a plurality of photoresistor light sensors (PLSs). The system may also further comprise a printed circuit board (PCB), wherein the plurality of PLSs is disposed on the PCB in a position selected from the group consisting of embedded in the PCB, on a top side of the PCB, on a bottom side of the PCB, on a lateral side of the PCB, or any combinations thereof. In a more preferred embodiment, the plurality of PLSs is disposed on a top side of the PCB. The PCB is of a linear or curved shape. The PCB may be of a thickness of from about 0.5 mm or less to 10 mm. Preferably, the PCB is from about 0.5 to about 10 mm, more preferably from about 1.0 mm to about 10 mm, and still more preferably from about 1.0 mm to about 5.0 mm and most preferably from about 1.0 to about 2.0 mm. Also, the PCB may be rigid or flexible and, preferably, is flexible.

The shelf is preferably part of a shelving system selected from the group consisting of spring pusher systems, gravity-feed roller shelf systems, gravity-feed gliding systems, static/flat shelf systems, grid systems and rack systems.

These and other aspects of the present disclosure will become known to those of skill in the art from the detailed description of preferred embodiments which follows.

BRIEF DESCRIPTION OF THE DRAWINGS

FIG. 7A shows a schematic view of wiring of four (4) PLSs on a PCB to a comparator according to an embodiment of the present disclosure, and FIG. 7B shows a configuration of an array of six (6) rows of PLSs on a PCB according to FIG. 7A and related hardware for use on a GRS, such as shown in FIG. 5, according to an embodiment of the present disclosure;

FIG. 9B shows a configuration of an array of six (6) rows of PLSs and related hardware for use on a GRS according to FIG. 9A;

FIG. 10B shows a configuration of an array of six (6) rows of PLSs and related hardware for use on a GRS according to an embodiment of the present disclosure;

FIG. 13B shows a front cross-section view of one (1) L-divider and one PLS.

DETAILED DESCRIPTION OF A PREFERRED EMBODIMENT

Referring to the FIGS., in the description that follows like elements will be denoted by like reference numbers. In the preferred embodiments shown in the FIGS. and described below, the signal generated by the at least one of the plurality of PLSs is a voltage but, as indicated above, the signal is not so limited.

Figure 1:
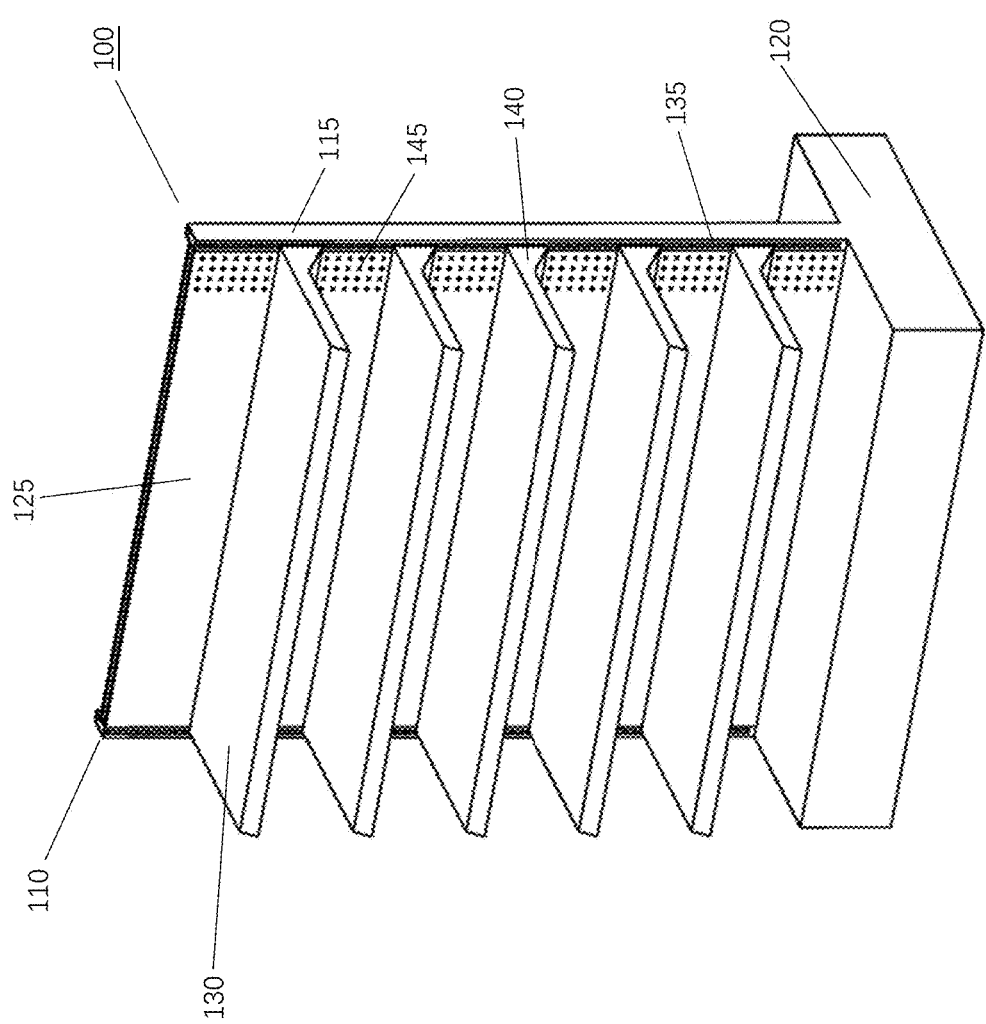
FIG. 1 is a right side front perspective view of a typical gondola shelving system.

FIG. 1 shows a typical gondola system 100 comprised of one left gondola upright 110, one right gondola upright 115, one deck 120, one pegboard/pegboard support system 125, and at least one shelf 130. Each gondola upright 110, 115 includes a set of evenly spaced support slots 135 for accepting shelf support brackets 140, as is standard in the art. Pegboard/pegboard support system 125 includes substantially evenly spaced horizontal rows and vertical columns of pegboard holes 145.

Figure 2A:
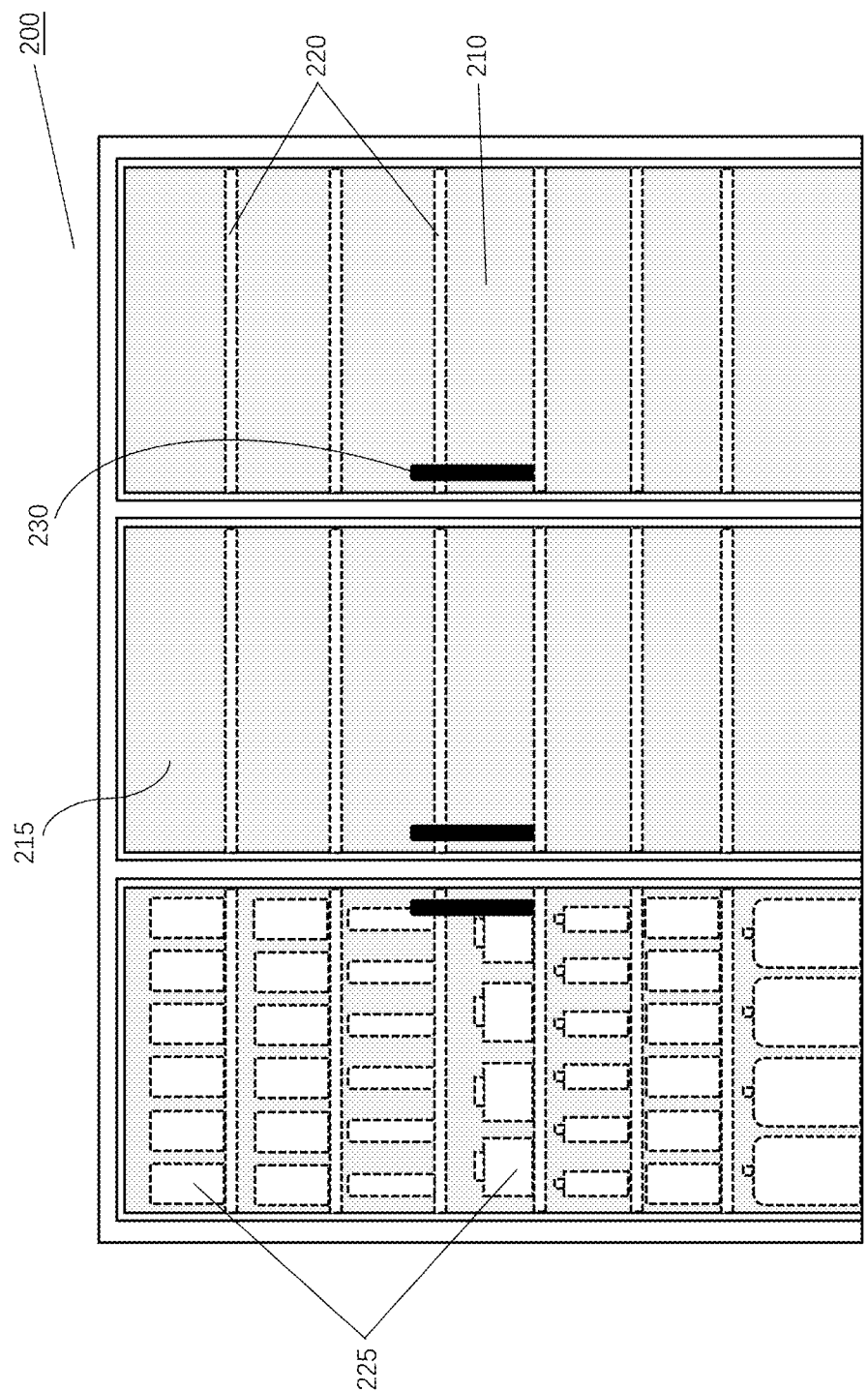
FIG. 2A is front view of a typical indoor cooler shelving system.
Figure 2B:
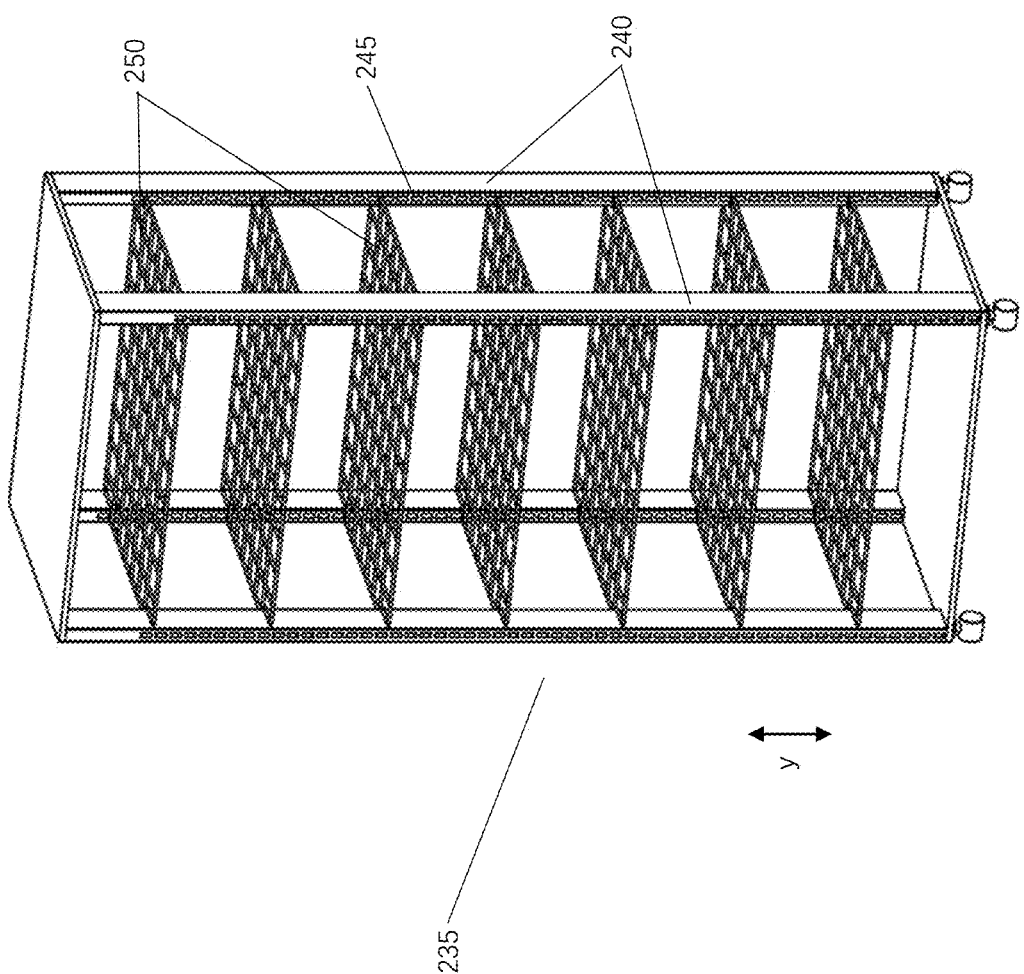
FIG. 2B is a right front side perspective view of wire shelf rack that may be used in the indoor cooling shelving system of FIG. 2A.

FIG. 2A shows a typical indoor cooler system 200. Indoor cooler system 200 typically includes a plurality of glass doors 210 that enclose refrigerated compartments 215 including shelving systems 220 that hold merchandise 225. Glass doors 210 may slide laterally, i.e. left to right, or may open and close using handles 230, as the case may be. FIG. 2B shows a typical rack shelving 235 that may be used in conjunction with indoor cooler system 200. Rack shelving 235 includes posts 240, each of which includes a plurality of evenly spaced support slots 245 that hold wire shelves 250, the distance between each of which, "Y", is variable depending on the height of the merchandise 225 placed on the wire shelves 250. Wire shelves 250 may be covered with mats (not shown) to prevent condensation from dripping from an upper wire shelf 250 to a lower one. Wire shelves 250 may be installed either level, i.e. perpendicular to posts 240 or on an incline from front to back so that merchandise 225 moves forward under its own weight as merchandise 225 is removed from the front of a row.

Figure 3A:
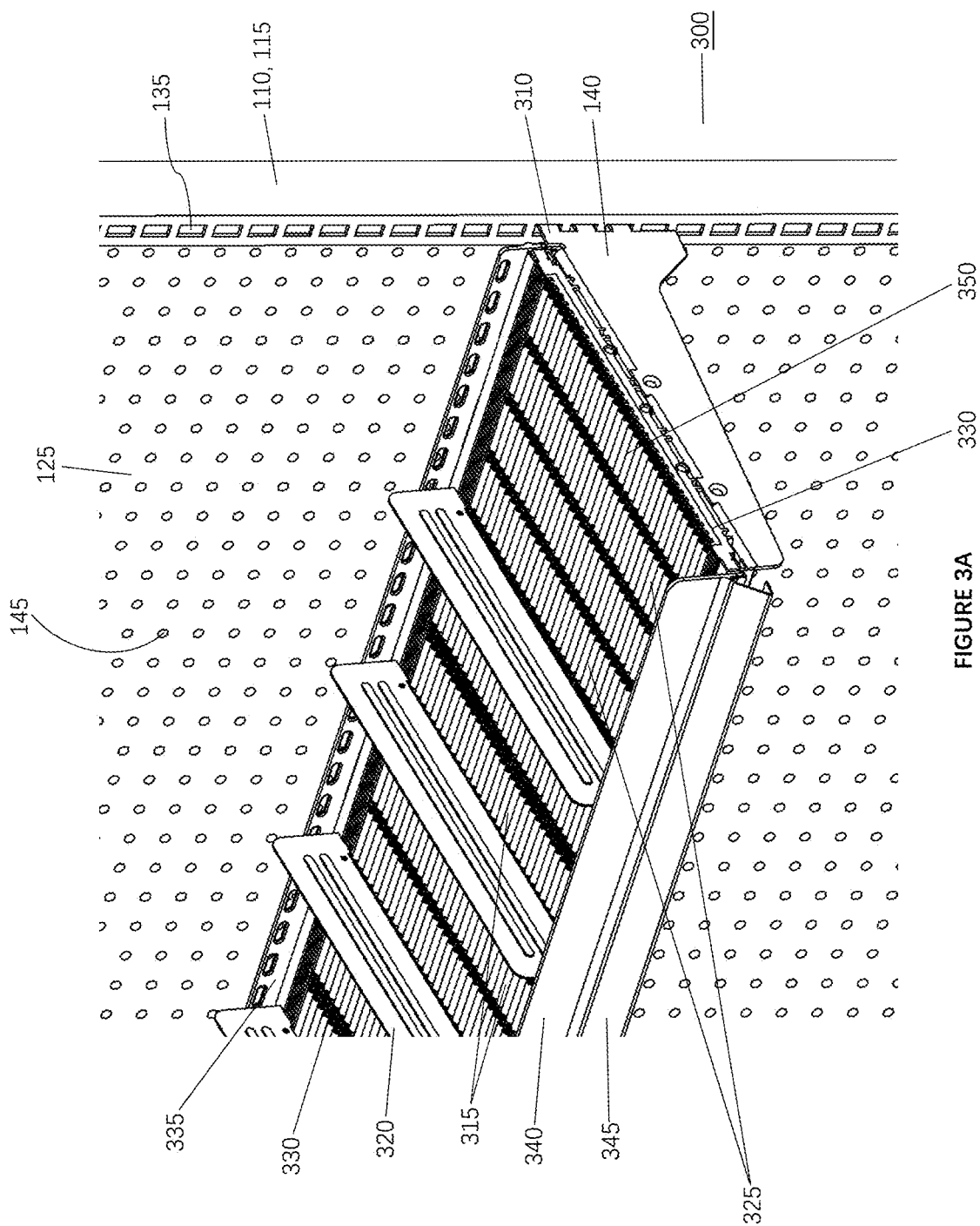
FIG. 3A is a right front perspective partial view of a known gravity-feed roller shelf ("GRS")
Figure 3B:
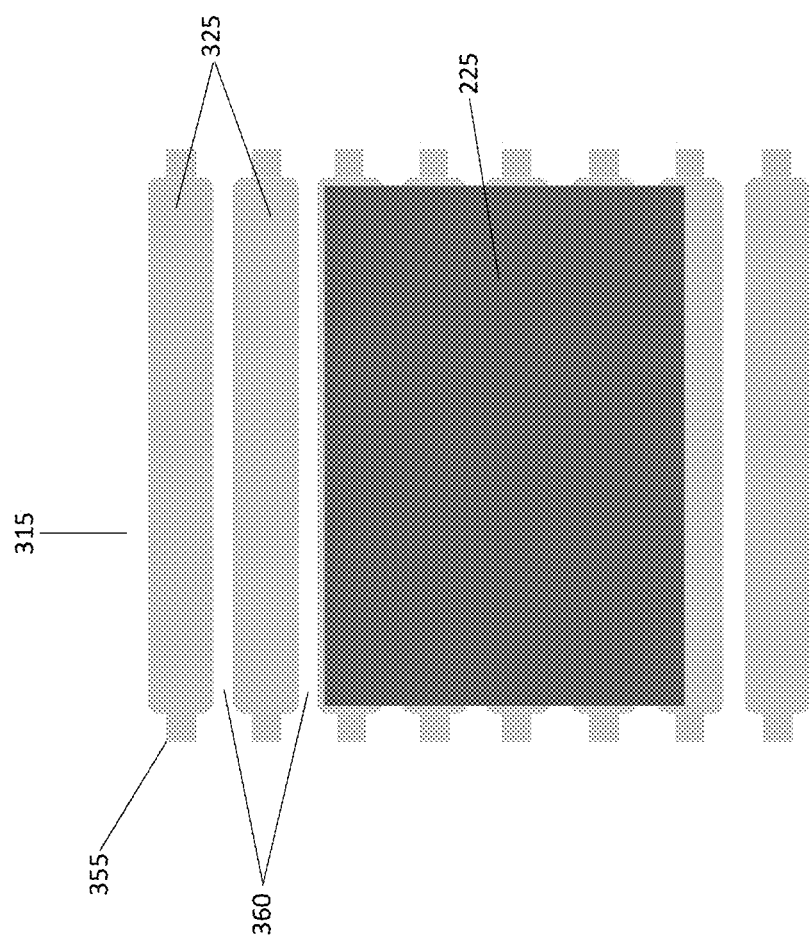
FIG. 3B is a simplified overhead schematic view of merchandise on a GRS.

FIG. 3A shows a typical GRS 300 disposed on gondola 100. GRS 300 includes brackets 140 having hooks 310 that insert into support slots 135 of uprights 110, 115. GRS 300 includes rows 315 of rollers 325. Separating rows 315 of rollers 325 are dividers 320 that are typically used to separate different types/brands of merchandise 225 disposed on GRS 300. An individual roller 325 is supported by roller supports 330 such that rollers 325 may freely spin to allow merchandise 225 to move forward from a position disposed near a rear rail 335 toward a front rail 340 under gravity. GRS 300 also typically includes a price strip 345. As shown in FIG. 3A, GRS 300 has an upper surface 350 that is at an incline from front rail 340 toward rear rail 335. Referring to FIG. 3B, rollers 325 of a row of rollers 315 have ends 355 that are designed to fit into roller support 330. Merchandise 225 is disposed on rollers 325. As can be seen in FIG. 3B, each pair of rollers 325 has a roller gap 360 therebetween. Roller gap 360 allows light to pass between rollers 325 onto a base surface (see, FIG. 5) of the GRS 300. As is also seen in FIG. 3B, light is prevented, totally or partially, from passing to the base of GRS 300 by merchandise 225. This difference in light passage enables the possibility of measuring actual inventory on GRS 300 by the use of PLSs, as will be described below.

Figure 4A:
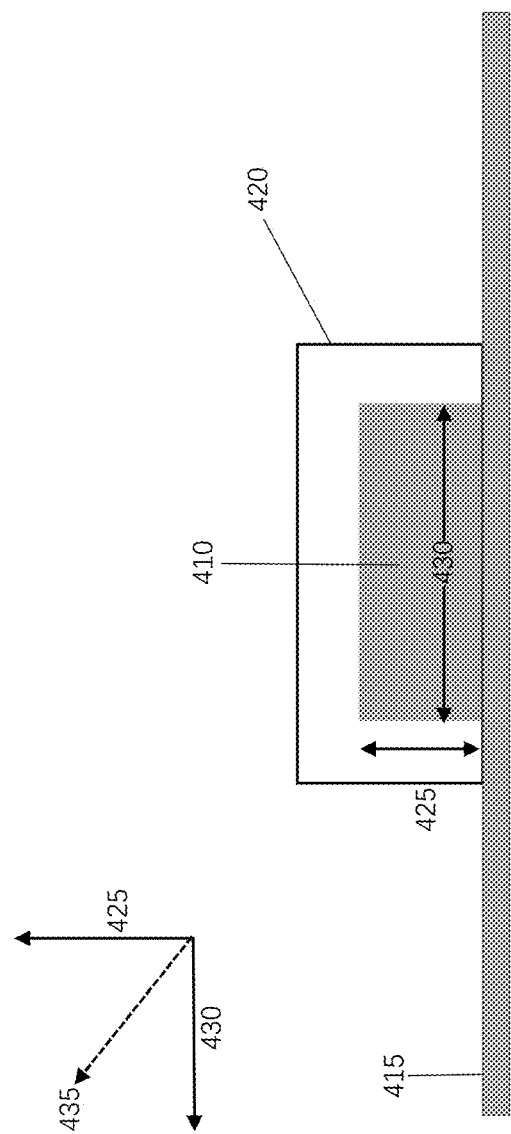
FIG. 4A is a side cross-section view of a photoresistor light sensor (PLS) placed onto a printed circuit board (PCB) according to an embodiment of the present disclosure.
Figure 4B:
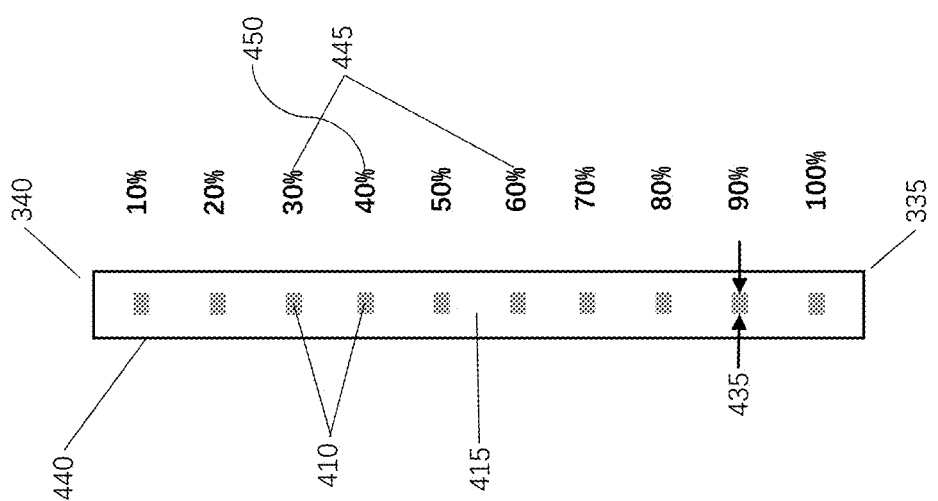
FIG. 4B is a schematic view of a strip of PLSs according to FIG. 4A that indicate merchandise occupancy on a, e.g., a GRS (not shown) shelf according to an embodiment of the present disclosure.

FIG. 4A shows a schematic of a PLS 410 on a PCB 415. In FIG. 4A, PLS 410 is disposed on PCB 415, and PLS 410 is enclosed by a cover 420 for durability and protection from damage. Cover 420 may be glass or a waterproof material as may be determined for any particular application of PLS 410. PLS 410 is three-dimensional, having a height 425, a depth 430 and a width 435. The size of PLS 410 can be designed on a case-by-case basis. For example, PLS 410 may have a width 435 of 3.5 mm, a depth 430 of 11 mm, and a height 425 of 2 mm. PCB 415 may preferably have a thickness of less than 2 mm, and preferably less than 1 mm. As noted above, PCB 415 may be flexible or rigid. Given the constant miniaturization of electronics, it is envisioned that PCB 415 may be of a thickness such that it can be rolled up. Of course, PLS 410 although shown and described generally in terms of a three-dimensional rectangular shape, can have any desired shape. A row (or face) of merchandise on GRS 300 is usually located between two dividers 320. FIG. 4B shows ten (10) PLS 410 locations on PCB 415. A series of ten (10) PLSs 410 was selected so that the concept of merchandise 225 percentage occupancy could be demonstrated in a simplified manner. In FIG. 4B, each PLS 410 that receives light through roller gaps 360 indicates a 10% difference in merchandise 225 occupancy on GRS 300. As shown in the simplified example in FIG. 4B, merchandise 225 occupancies 445 such as 10%, 20% and 30%, up to 100% can be readily determined, as will be explained in more detail in relation to the FIGS. that follow. For example, merchandise 225 occupancy of 40% means that there is no merchandise 225 beyond 40% of the shelf depth toward rear rail 335 of GRS 300, indicated at 450 in FIG. 4B. Thus, the actual inventory is 40% of full occupancy, whatever the actual numbers of merchandise 225 may be. The accuracy of the inventory data is dependent, as will be recognized by those of skill in the art, on the number or "density" of PLS 410 along the surface of a shelf.

Figure 5:
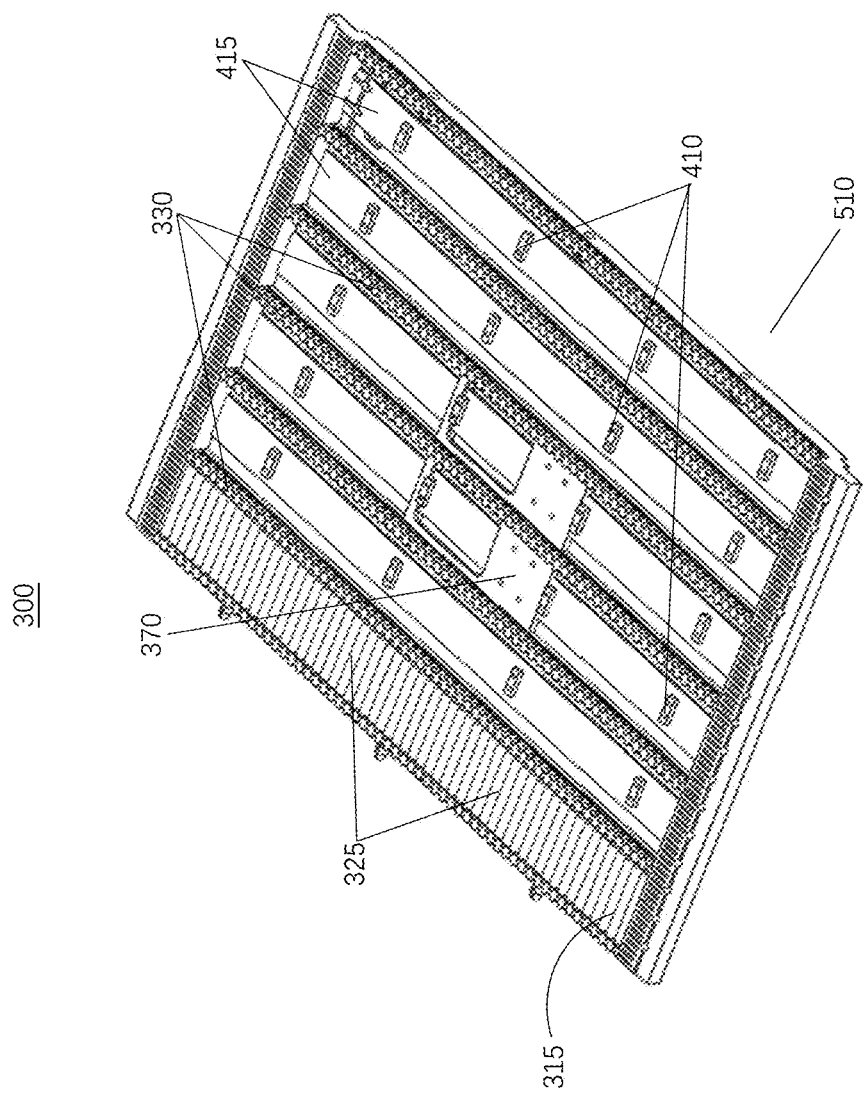
FIG. 5 is a partial cut-away view of a GRS showing strips having four (4) PLSs located on a GRS base according to an embodiment of the present disclosure.

FIG. 5 shows a representative embodiment of PLSs 410 on PCB 415 disposed on base 510 of GRS 300. Five (5) rows 315 of rollers 325 are removed in FIG. 5 for purposes of clarity. PLSs 410 are disposed in arrays of four (4) on each PCB 415 and placed on base 510 below rows 315 of rollers 325. As will be appreciated by one of skill in the art, the array of PLSs 410 shown in FIG. 5 would be less accurate in real-time inventory analysis than the array of PLSs 410 shown in FIG. 4B. This is because the array shown in FIG. 5 comprises only four (4) PLSs 410, rendering real-time inventory "capture" to increments of approximately 25%. FIG. 5 also shows seat 370 (obscured by rows 315 of rollers 325 in FIG. 3A) that is used to accept a storage bracket of spare rollers 325, as is known in the art).

As will be recognized by those of skill in the art, light signals recorded by PLSs 410 are converted to electric signals. Each PLS 410 connects to a comparator 660 by electric wires 710 on PCB 415 (see, FIG. 7). All light signals are translated into analog data and delivered to comparator 660 to be converted to digital data. Inventory data can therefore be recorded and collected.

Figure 6A:
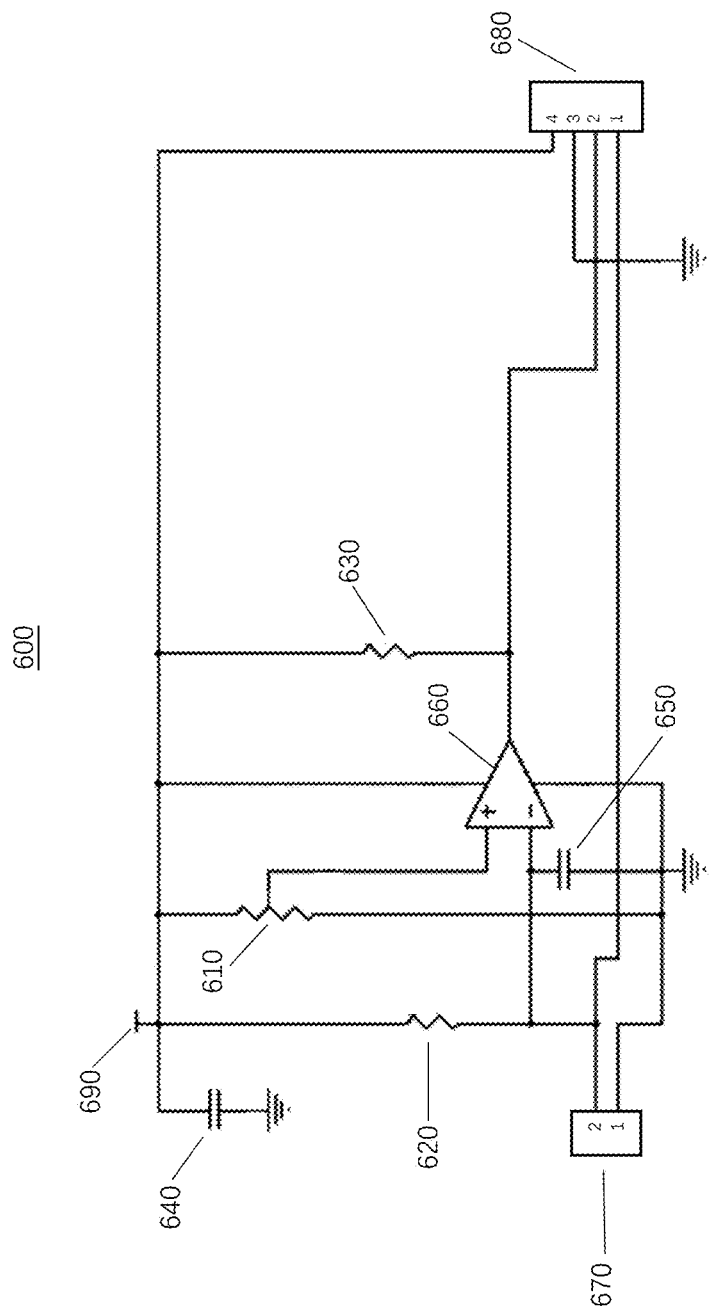
FIGS. 6A and 6B show wiring diagrams and digital data input and output, respectively, for a comparator that can be used in conjunction with the PLS according to an embodiment of the present disclosure.
Figure 6B:
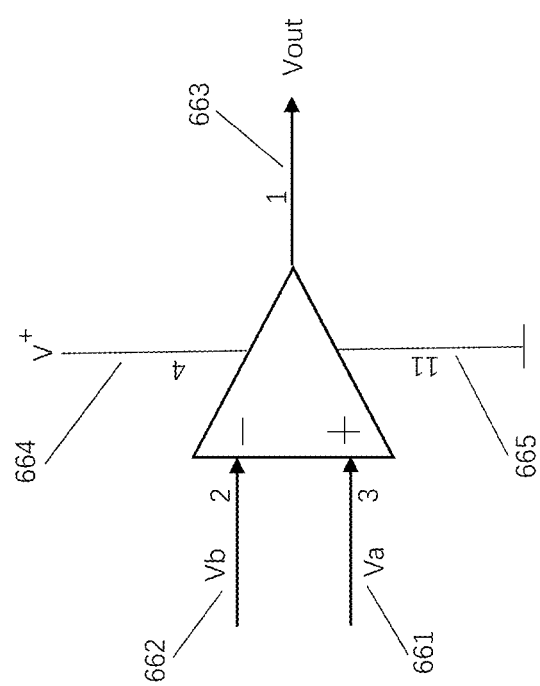

FIGS. 6A and 6B show the working mechanism of a comparator system 600. As shown in FIG. 6A, comparator system 600 is comprised of variable resistor 610, resistors 620 and 630, capacitors 640 and 650, a wide-voltage comparator 660, a 2-pin plug 670, a 4-pin plug 680, and a positive pole of socket 690 receiving DC power from a source of DC current (not shown). Variable resistor 610 can be adjusted for a proper working voltage for the logic of wide-voltage comparator 660. Resistors 620 and 630 are used to build a standard voltage to compare to the working logic voltage, as shown in FIG. 6B. 2-pin plug 670 connects comparator system 600 to a PLS 410, where the numbers 1 and 2 of 2-pin plug 670 are two connections linked to the two "feet" of PLS 410. The 4-pin plug 680 is the output of comparator system 600 for TTL signals. Numbers of 1, 2, 3 and 4 of 4-pin plug 680 are the connections of comparator system 600. In practice, comparator system 600 usually has two comparators 660 and four connections, two connections per comparator 660. The foregoing is a typical electric diagram of comparator system 600 used to illustrate the working mechanism of the present disclosure. Of course, it will be appreciated by those of skill in the art that the comparator system 600 could have other designs.

PLS 410 functions in the lighting environment of retail stores because the sensitivity of PLS 410 is similar to the recognition/reception by human eyes to visual light, i.e. within a range of the light spectrum from 0.40 µm to 0.76 µm. Furthermore, dim light can be recorded by PLS 410 by adjusting photoresistor. Consequently, the lighting environment of the location of shelves in most retail stores is satisfactory for the function for PLS 410, in general. However, in some cases it may be beneficial to enhance the light available for reception by PLS 410. For example, as an option for a practical solution as a light enhancement, LED beads can be placed in proper position to create sufficient light for PLS 410. As an example of placement of LED beads, in the case of GRS 300, LED beads can be placed in proximity to the openings of the bottoms of shelves, thereby lighting the space underneath. Electric resistance of PLS 410 will have a steep drop when PLS 410 receives light. Consequently, the electric voltage of PLS 410 will also drop. As a result, a change of light becomes a change of voltage. This change is consequently delivered to a wide-voltage comparator, such as 660, which compares the voltage to the standard voltage after comparing two analog voltages, as shown in FIG. 6A.

FIG. 6B shows comparator 660 with two voltage inputs i.e., one in-phase 661 (marked by "+") and another, out-of-phase 662 (marked by "−"). There is a voltage output 663 ("$V_{OUT}$") for a TTL signal (i.e., TTL=transistor-transistor logic, marked by number "1"), a power supply 664 ("V+", marked by number 4), a ground connection 665 (marked by number 11), and two voltage inputs 661, 662 from PLS 410 (marked by numbers 3 and 2, respectively). As shown in FIG. 6B, a single comparator 660 has an in-phase input voltage 661 (marked by "Va") and an out-of-phase input voltage 662 (marked by "Vb"). If $T_0$-$T_1$ is defined as the time duration without merchandise 225 on the GRS 300, PLS 410 receives light and reduces the voltage, then Va<Vb, where Va is the voltage of PLS 410 and Vb is the standard voltage. Consequently, the output 663 of comparator 660 is "0" (TTL signal of $V_{OUT}$). If $T_1$-$T_2$ is defined as when merchandise is on the shelf and the voltage of PLS 410 becomes larger than Vb (i.e., the standard voltage), then Va>Vb. The consequence of the foregoing is that the output of comparator 660 is "1" (TTL signal of $V_{OUT}$). Furthermore, if Va<Vb during $T_2$-$T_3$ when merchandise 225 is removed from the GRS 300, then the TTL signal of $V_{OUT}$ again becomes "0". In short, the difference of Va and Vb will be measured and recorded as "0" or "1" and then transmitted to the reader 790 (shown in FIG. 7B). Reader 790 will be further described in details in paragraphs that follow. In FIG. 6A, as is understood by those of skill in the art, a gate can be set up to adjust variable resistor 610. Reader 790 receives a digital signal of "1" when light above the sensor is blocked by merchandise 225. Otherwise, reader 790 receives a digital signal of "0" when no merchandise is above the sensor and light is not blocked. Therefore, the state of merchandise 225 "in" or "not in" a given position on GRS 300 will be recorded.

FIG. 7A shows an array 705 of four (4) PLS 410 and wires 710 on PCB 415 that is configured to be placed within a 2"-wide row 315 of rollers 325 of GRS 300. All wires 710 are connected to a plug 720. As mentioned, in the example shown in FIG. 7A, four (4) PLSs 410, 8 wires 710 and an 8-pin plug 720 are shown. The numbers of PLSs 410 can be varied depending upon design and, as mentioned above, accuracy requirements since a greater number of PLSs 410 per row 315 of rollers 325 increases accuracy. FIG. 7B shows a merchandise inventory data collection system 700 for a 12"-wide, six (6) row GRS 300 comprised of six (6) 2"-wide rows 315 of rollers 325. Twenty-four (24) PLSs 410 integrated on PCB 415 is referred to as a "sensor PCB" 785. In the embodiment shown in FIG. 7B, there are four (4) PLSs 410 per 2"-wide row 315 of rollers 325 placed on PCB 415 from which all wires link to the connector i.e. 8-pin plug 720. Digital TTL signals output by comparator 660 are converted to RS232 signals for a wireless system, an industrial standard signal, by a converter 730 for recognition by a CPU 740. Converter 730 of FIG. 7B provides conversion of the digital TTL signals to the above-mentioned RS232 signals. RS232 signals are communicated to a wireless module 750 that transfers the RS232 signals to a server (not shown) through CPU 740. Alternatively, the RS232 signals can be linked to the internet directly thought connectors instead of through wireless module 750. In the embodiment shown in FIG. 7B, one comparator 660 operates in conjunction with one sensor PLS 410, i.e., four (4) comparators 660 and four (4) PLSs 410 per 2"-wide row 315 of rollers 325, for a total of twenty-four (24) comparators 660 and twenty-four (24) PLSs 410 per 12"-wide GRS shelf. Wireless module 750 is used to transfer the above-mentioned RS232 signals to CPU 740. A power management module 760 supplies DC, e.g., DC 3.3V, to both converter 730 and CPU 740, and supplies DC, e.g., DC 5V, to PLS 410. DC 6-24V is the range of voltages for voltage input 770 and voltage output 780. All the above mentioned parts on "reader PCB" 786 and "sensor PCB" 785 together form the reader 790. In short, two PCBs (i.e., one sensor PCB 785 and one reader PCB 786) manage all real-time inventory data for one 12"-wide GRS 300, and form merchandise inventory collection system 700. As will be appreciated from the above discussion, it is not necessary to provide power management module 760 if the digital RS232 signals are transferred directly to the internet, or other cable systems. The connector for direct internet linkage provides power management. Generally, there are two methods to communicate with server 800 (see, FIG. 8), i.e., wireless and cable. If cable is used, RS232 signal will be converted to RS485 signal by CPU 740 to communicate with server 800 though cable system. Sensor PCB 785, reader PCB 786, or together as one PCB, may be linear, sheet or in any other shape, and can be made using hard board(s) or flexible board(s).

Figure 8:
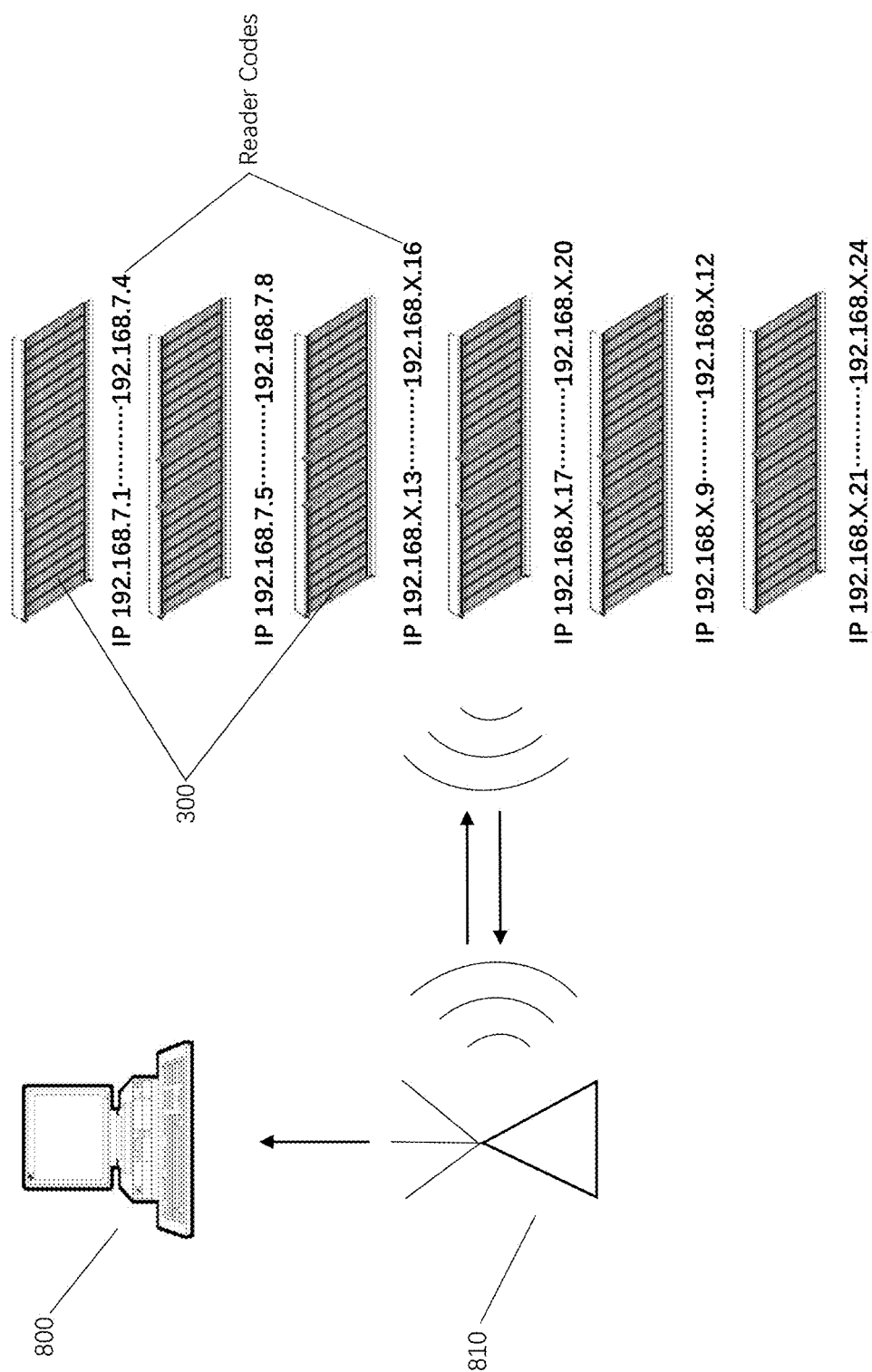
FIG. 8 shows a schematic view of six GRSs having PLSs according to an embodiment of the present disclosure in wireless communication with a server (database) via a router.

FIG. 8 shows the transfer of signal data from a series of six (6) GRS 300 of 48" width on a gondola to a server (database) 800 as a central data controller. Each 48"-wide GRS 300 is comprised of four (4) 12"-wide merchandise inventory data collection systems 700, each having four (4) arrays 705 and four (4) readers 790. Each reader 790 collects and transfers inventory data via wireless module 750 to server 800 through a wireless router 810 as well as sends instructions to reader 790 though wireless router 810, again via wireless module 750, as indicated by the double arrow between wireless router 810 and six (6) GRSs 300. In FIG. 8, the numbers represent the reader codes for each array 705, thereby providing individual inventory information for each row 315 of rollers 325. In FIG. 8, the numbers of "IP 192.168" are the datum codes, and the numbers "7.1" to "7.4" and "7.5" to "7.8" are reader 790 codes. Similarly, "x9 . . . x12", "x13" . . . "x16"; "x17 . . . x20" and "x21 . . . x24" represent reader 790 codes, respectively.

The sizes of PLSs 410 and PCBs 415, as well as their positions on the shelf base, are designed in accordance with the shelf, merchandise planogram and other related requirements.

Figure 9A:
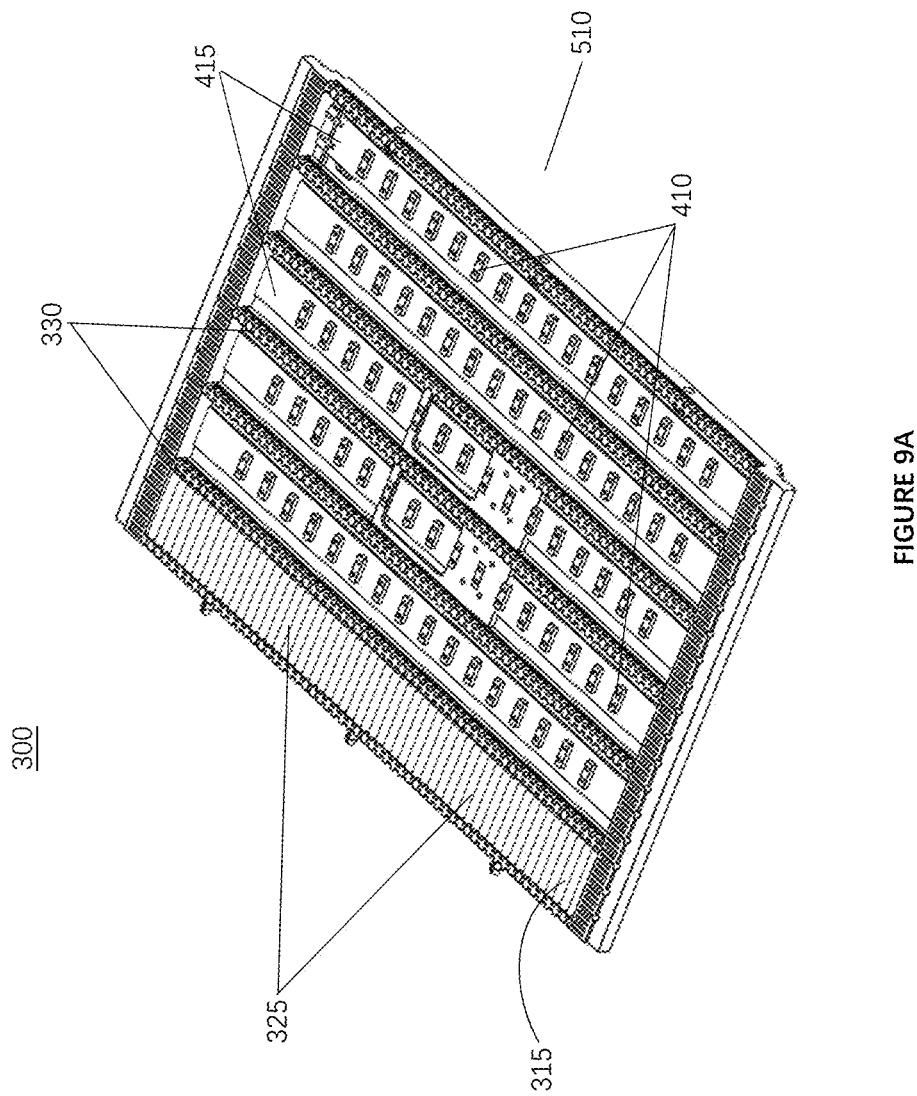
FIG. 9A shows a partial cutaway view of a six (6) row GRS having 16 PLSs per row according to an embodiment of the present disclosure.

FIG. 9A is similar to FIG. 5 and shows a 12"-wide GRS 300 comprised of six 2"-wide rows 315 of rollers 325. In the embodiment shown in FIG. 9A, there are 16 PLSs 410 per 2"-wide row 315 of rollers 325. FIG. 9B shows a merchandise inventory collection system 900 that is in general similar to that shown in FIG. 5. In detail, FIG. 9B shows the embodiment where there are sixteen (16) PLSs 410 per 2"-row 315 of rollers 325. In FIG. 9B, one (1) input-output switch 910 ("IO-switch") manages eight (8) PLSs 410, based on a sequential one-by-one handling process. It takes a short period, e.g., 0.2" (seconds), to read/receive data from one sensor. This translates to approximately 1.6" (seconds) per cycle for the eight (8) PLSs 410. Thus, two IO-switches 910 control sixteen (16) PLSs 410. Furthermore, one comparator system 600 manages multiple IO-switches 910, so that for example perhaps six (6) IO-switches 910 manage forty-eight (48) PLSs 410, and receive analog data concerning inventory from all forty-eight (48) PLSs 410. It will be appreciated that this is different from the one-to-one process for managing one comparator 660 and one PLS 410 as described above. In FIG. 9B, one (1) IO-switch 910 manages eight (8) PLSs 410, and one comparator system 600 manages six (6) IO-switches 910, thereby processing forty-eight (48) PLSs 410. Therefore, one reader 790 system comprises 6 connectors 720, 2 comparators 660, 12 IO-switches 910, one converter 730 similar to that of FIG. 7B, one CPU 740, one wireless module 750, one power management module 760, one DC 6-24V input 770 and one DC 6-24V output 780. All these parts can be assembled on one PCB 920 called a "reader PCB" 920. Reader PCB 920 works in conjunction with ninety-six (96) PLSs 410 on another integral PCB called the "sensor PCB" 930. In short, two PCBs (i.e., one sensor PCB 930 and one reader PCB 920) manage all real-time inventory data for one 12"-wide GRS 300. Both sensor PCB 930 and reader PCB 920 form merchandise inventory collection system 900 (i.e., data collection unit, or DCU) and can be connected by a flexible connector PCB 940. Four DCUs work for one 48"-wide GRS 300. Dimensions, parts and part quantities of DCUs can be changed in accordance with the GRS 300 selected. Generally, there are two methods to communicate with server 800, i.e., wireless and cable. If cable is used, RS232 signal will be converted to RS485 signal by CPU 740 to communicate with server 800 though cable system. Furthermore, sensor PCB 930, reader PCB 920, or together as one PCB, may be linear, sheet or in any other shape, and can be made using hard board(s) or flexible board(s). The digital signals converted from analog signals can be stored in reader PCB 920 for further/later communicating with server 800. In addition, binary, hexadecimal or other numbering systems can be used.

Figure 10A:
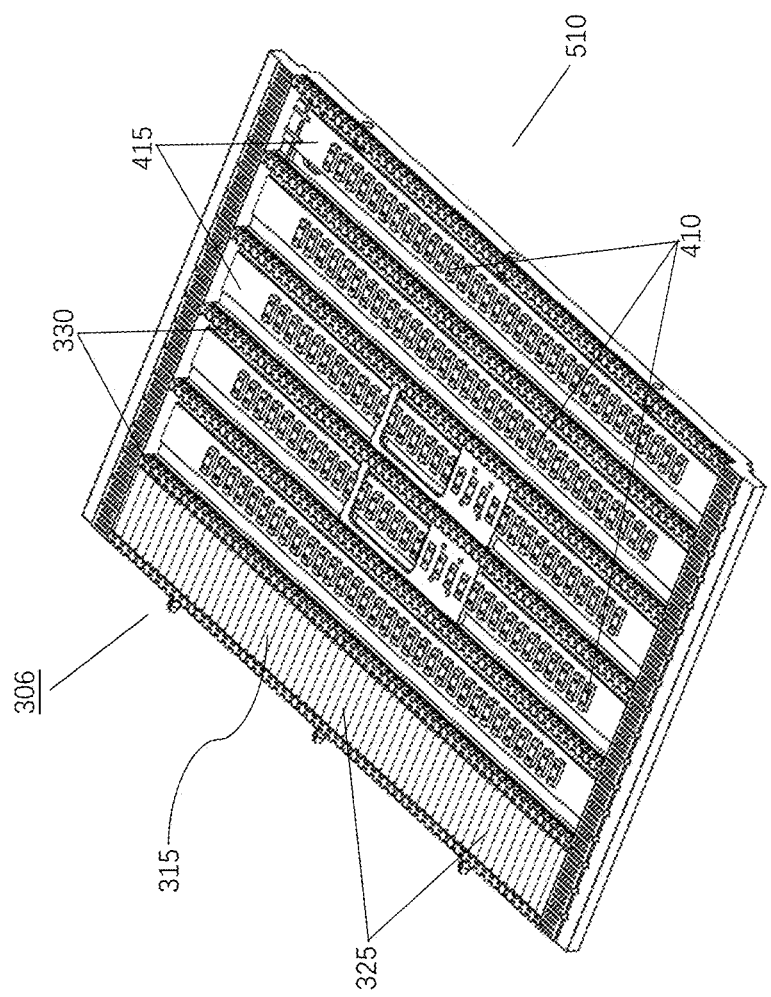
FIG. 10A shows a partial cutaway view of a six (6) row GRS having 32 PLSs per row according to the present disclosure.

FIG. 10A is again similar to FIG. 5 and shows a 12"-wide GRS 300 comprised of six 2"-wide rows 315 of rollers 325. In the embodiment shown in FIG. 10A, there are 32 sensors per 2"-wide row 315 of rollers 325. Similar to FIG. 9B, FIG. 10B shows the embodiment where 32 PLSs 410 are used per row 315 of rollers 325. One reader PCB 1020 is comprised of 6 connectors 720, 4 comparator systems 600, 24 IO-switches 910, one converter 730, one CPU 740, one wireless module 750, one power management module 760, one DC 6-24V input 770 and one DC 6-24V output 780. One reader PCB 1020 processes 192 PLSs 410 on integral sensor PCB 1030. One reader PCB 1020 and one sensor PCB 1030 form one DCU for a 12"-wide GRS 300. A 48"-wide GRS 300 requires one DCU. Again, generally, there are two methods to communicate with server 800, i.e., wireless and cable and as mentioned previously, if cable is used, RS232 signal will be converted to RS485 signal by CPU 740 to communicate with server 800 though cable system. Furthermore, the sensor PCB 1030, the reader PCB 1020, or together as one PCB, may be linear, sheet or in any other shape, and can be made using hard board(s) or flexible board(s).

As a practical matter, 16 PLSs 410 per row 315 of rollers 325 are used to measure shelf inventory. A GRS 300 depth of 16" is sufficient if merchandise diameters (depths) are not less than about 1". Similarly, 32 PLSs 410 per row 315 of rollers 325 can be used for shelf depths less than 72" if merchandise diameters are not less than about 2". For indoor coolers, beverage package sizes are usually not less than 2", requiring 16 or 32 PLSs 410 for inventory control on a shelf less than 72" deep.

The above describes the mechanism and functions of PLSs 410 to detect and record information concerning merchandise inventory on a shelf such as a GRS 300.

Having described details for GRS 300 shelving systems, the embodiment for a different shelving system, i.e., a spring-pusher system, follows.

Figure 11A:
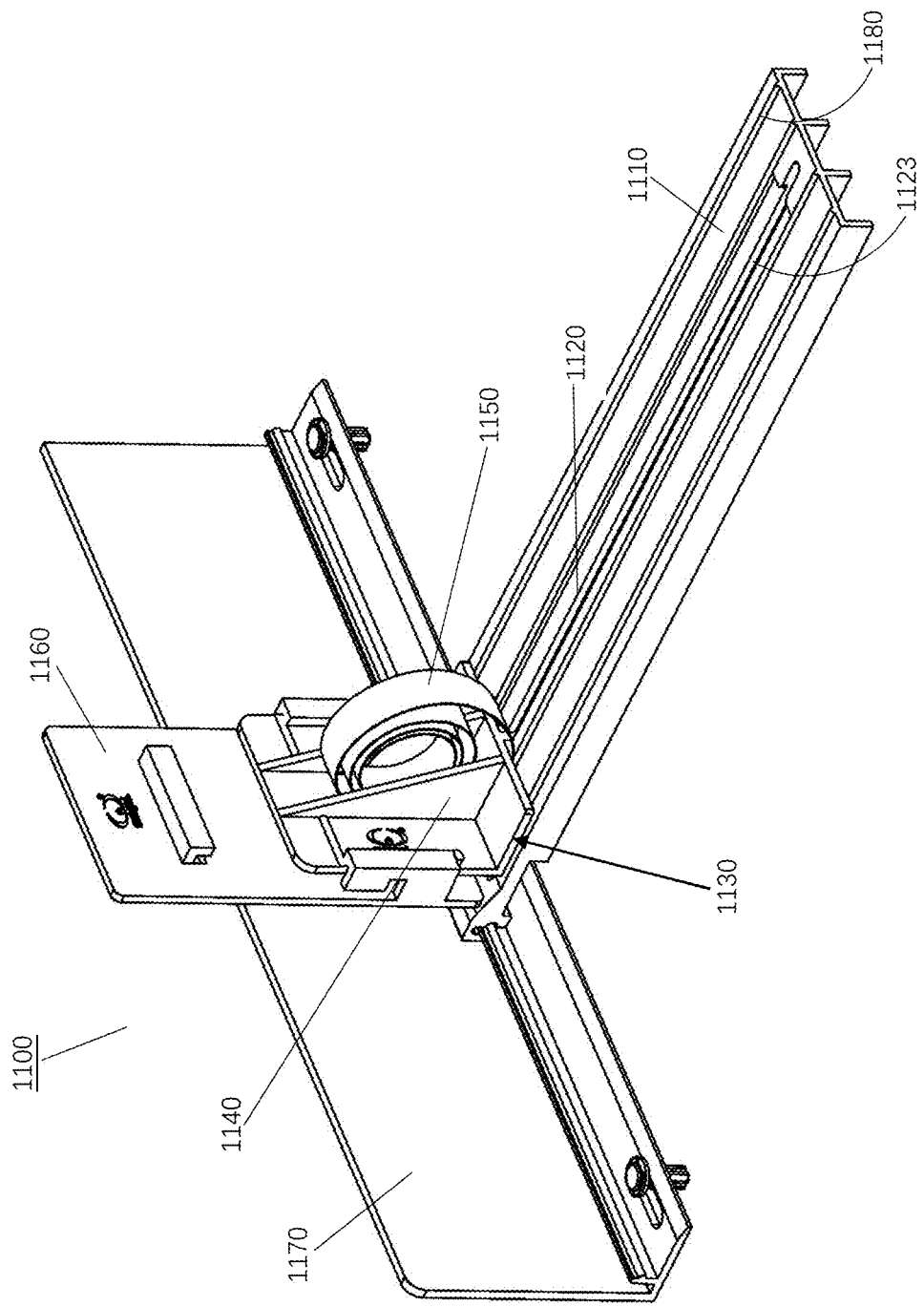
FIG. 11A shows a left side rear perspective view of a spring-pusher system shelf assembly.
Figure 11B:
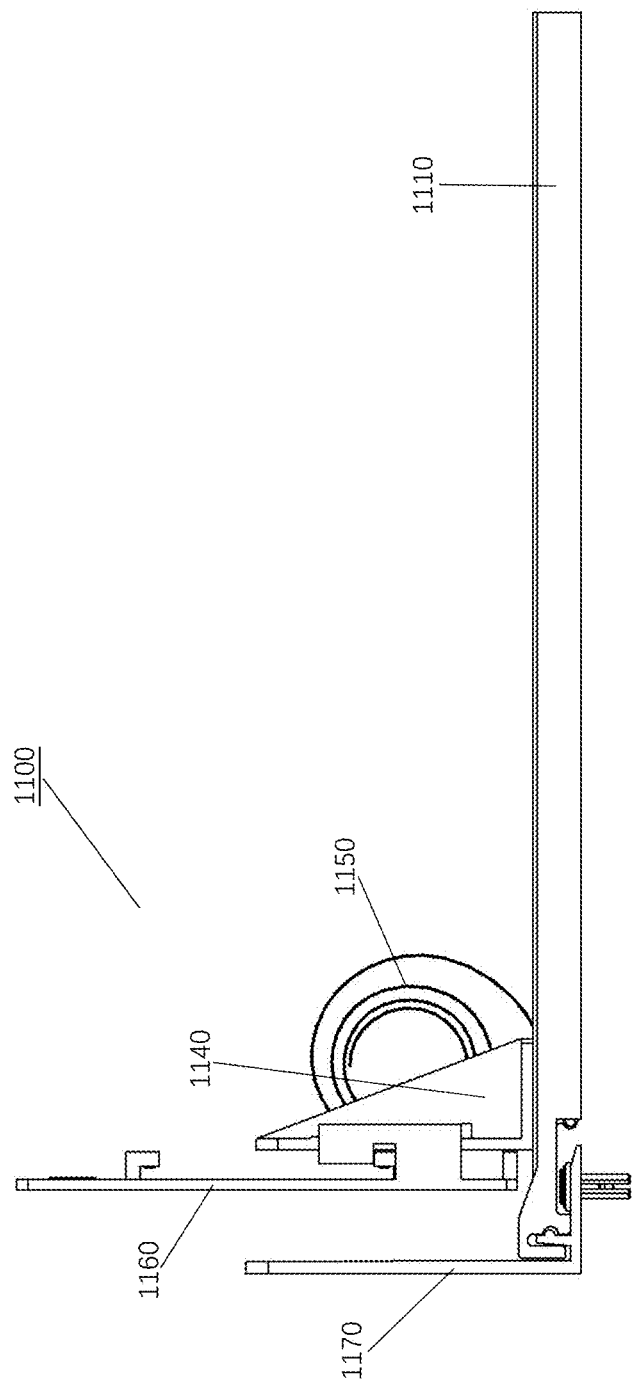
FIG. 11B shows a side view of the spring-pusher system shelf assembly of FIG. 11A.
Figure 11C:
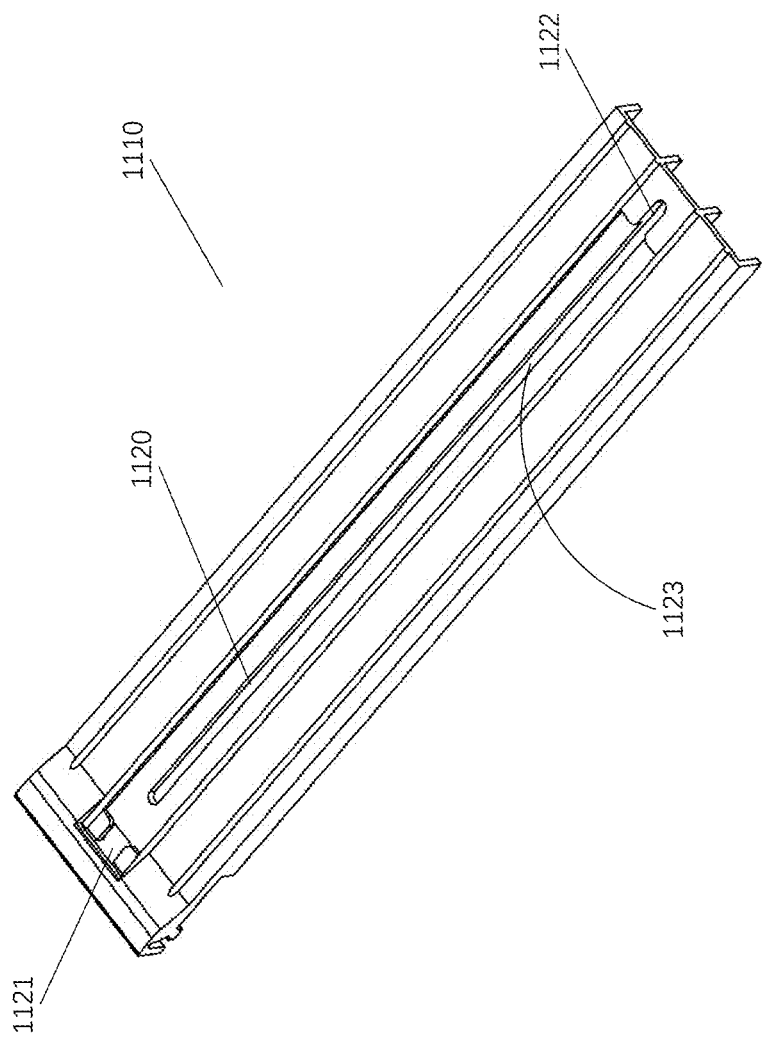
FIG. 11C shows a detail view of a spring-pusher base without any of the additional elements shown in FIGS. 11A and 11B.

FIGS. 11A, 11B and 11C show a typical spring-pusher system 1100 comprised of a base 1110 with an opening-slot track 1120 for a sliding pusher 1130 comprised of a head and coil seat 1140, a coil spring 1150 and a front panel 1160. One end of coil spring 1150 is locked at a front end 1121 opening-slot track 1120 and the other end of coil spring 1150 is locked at the seat 1140. Spring pusher system 1100 advances merchandise toward the front of shelf automatically as merchandise is removed, and a shelf front stop 1170 prevents merchandise from being pushed off the shelf. Opening-slot track 1120 can be used for PLSs 410 placed below the opening 1123. As can be seen in FIGS. 11A and 11C, opening-slot track 1120 has a depth 1180 that is disposed below sliding pusher 1130. Besides opening 1123 of opening-slot track 1120, the side of depth 1180 can be also used for PLSs 410. Based on the detailed description set forth above, one of skill in the art can readily design a DCU comprised of one reader PCB and one sensor PCB for use as a merchandise inventory data collection system with spring-pusher system 1100.

Figure 12:
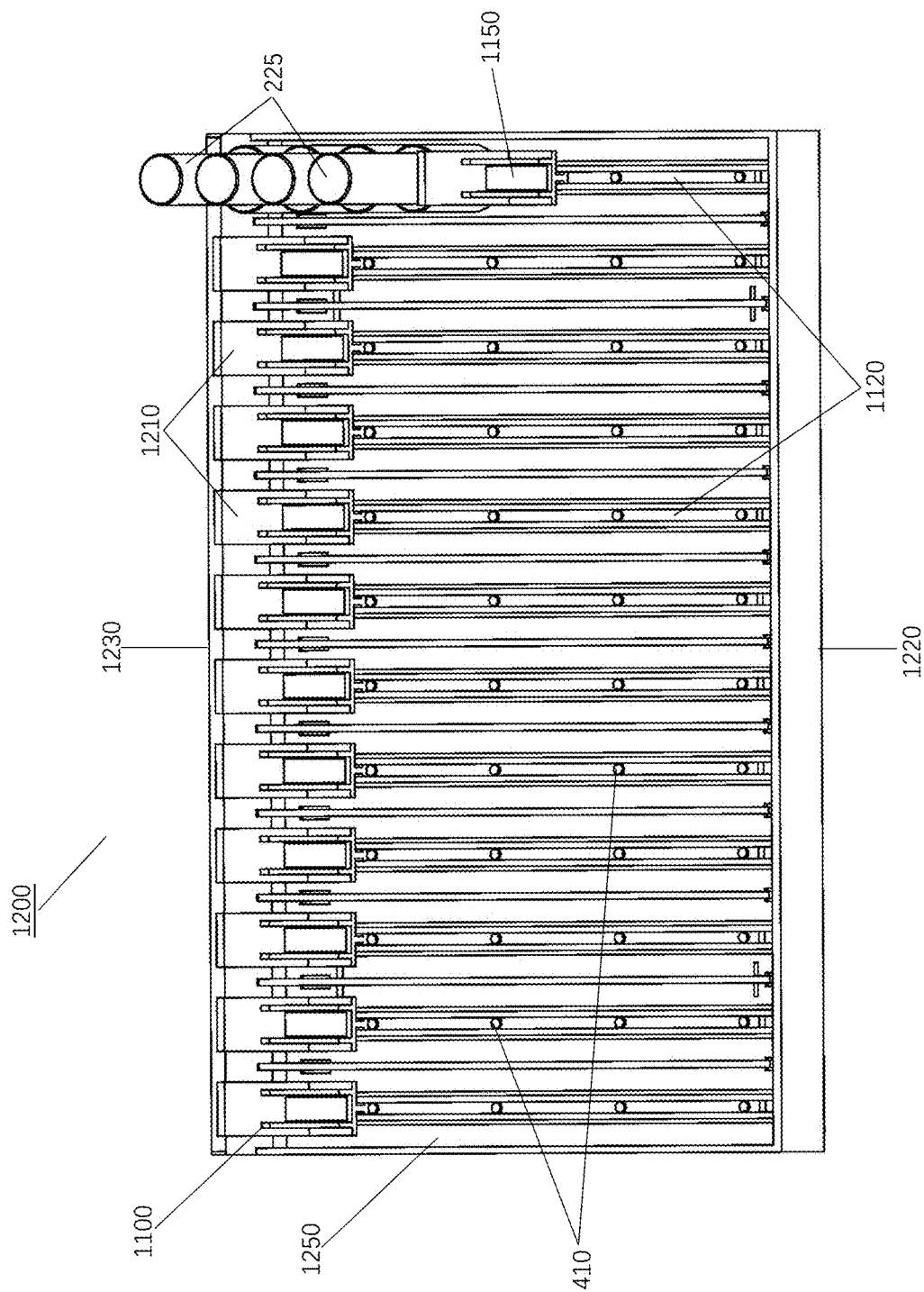
FIG. 12 shows an overhead view of a typical cosmetic insert tray with multiple facings using a spring-pusher system.

FIG. 12 shows a typical cosmetic insert tray 1200 with multiple facings 1210. Spring-pusher systems such as 1100 described with respect to FIGS. 11A, 11B and 11C can be used to drive merchandise 225 from the rear 1220 of cosmetic insert tray 1200 toward the front 1230 of cosmetic insert tray 1200. Merchandise 225 can include nail polish, lip stick, face powders, etc. Facings 1210 generally number from 3 to 16. Cosmetic insert tray 1200 is seated on carrier tray (not shown) which is placed on the cosmetic (gondola) wall by inserting its two brackets into gondola wall standard slots. The use of LEDs for light enhancement, as described above, is optional. PLSs 410 can be placed under the opening-slot track 1120 of the cosmetic insert tray. Coil spring 1150 and/or merchandise 225 blocks light from reaching PLSs 410 as is shown and can be understood from the rightmost side of FIG. 12. The foregoing would be a typical application of a merchandise inventory data collection system using PLSs. And again, based on the detailed description set forth above, one of skill in the art can readily design a DCU comprised of one reader PCB and one sensor PCB for use as a merchandise inventory data collection system with a cosmetic insert tray. Furthermore, the sensor PCB, the reader PCB, or together as one PCB, may be linear, sheet or in any other shape, and can be made using hard board(s) or flexible board(s).

Figure 13A:
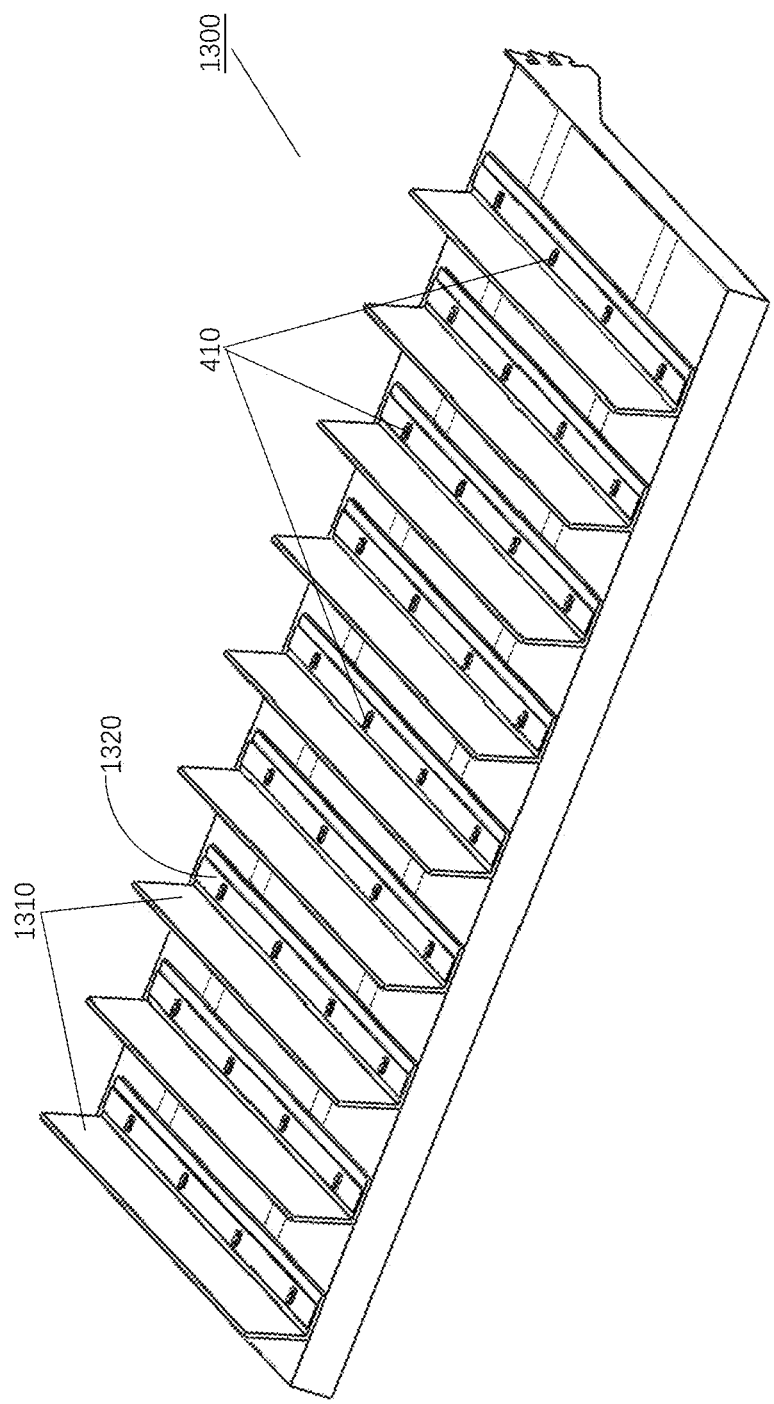
FIG. 13A shows a top right side perspective view of a shelf with L-dividers used with a spring-pusher system and PLSs.
Figure 13C:
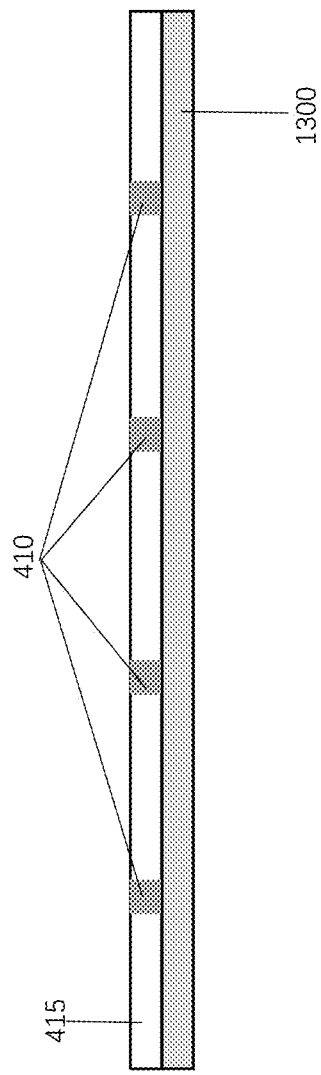
FIG. 13C shows a side cross-section view of the PLS PCB and shelf of FIG. 13A without the L-divider.

In addition to the foregoing, PLSs 410 can be used for L-dividers that are often used in conjunction with spring-pusher systems, such as described above with reference to FIGS. 11A-11C, that are widely used in retail. FIG. 13A is a top right side perspective view showing a shelf 1300, with L-dividers 1310 having opening-slot tracks 1320 and PLSs 410 disposed in association with the opening slot tracks. A spring pusher (not shown) would be disposed and operate in association with the L-dividers and opening-slot track in a manner similar to that described in conjunction with FIGS. 11A-11C, as would be understood by one of skill in the art. FIG. 13B is a front cross-section view side view showing one L-divider 1310, opening-slot track 1320, PLSs 410, PCB 415 and shelf 1310. FIG. 13C is a side cross-section view of the shelf 1300 of FIG. 13A, without L-dividers 1310, showing PLSs 410 and PCB 415 disposed on the shelf 1300. Details of the operation of the embodiment of the present disclosure shown in FIGS. 13A-13C are not recited here since those details would be understood by one of skill in the art from the above detailed description. In general, similar to the embodiments of both GRS 300 and spring-pusher assembly 1100, PLSs 410 are placed under opening-slot track 1320 on shelf 1300 or adjacent opening-slot track 1320 under merchandise 225. The actual positions and number of PLSs 410 can be arranged for any particular design/accuracy choice.

Figure 14A:
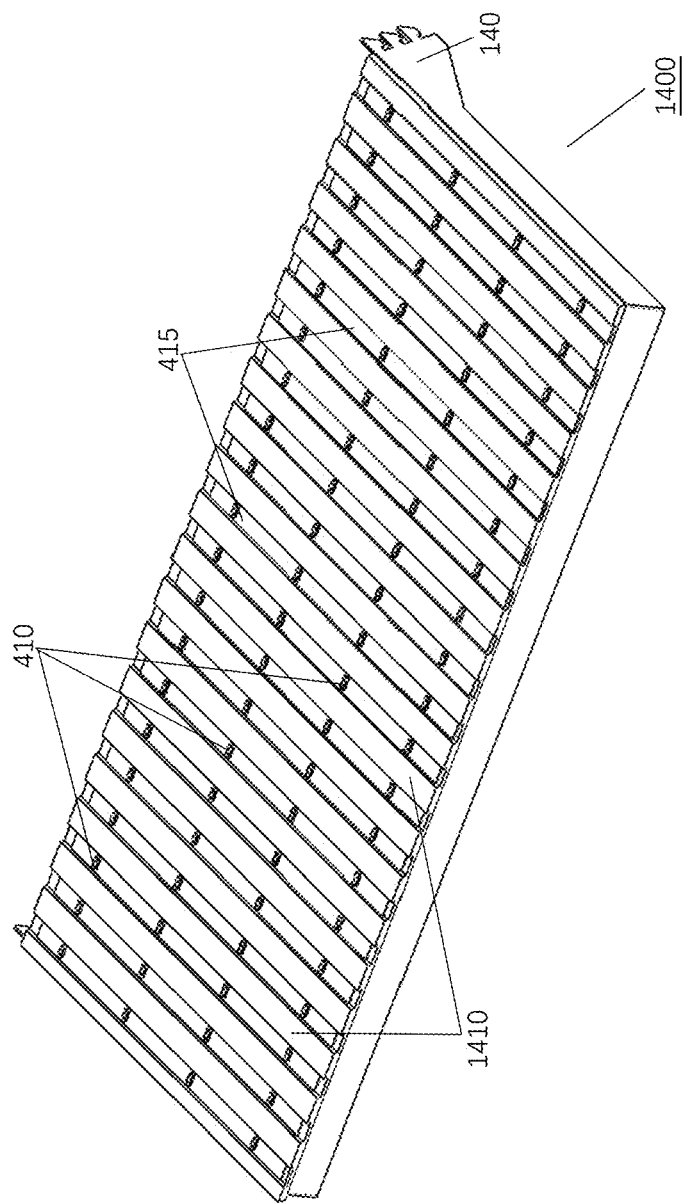
FIG. 14A shows a top right side perspective view of a flat shelf having PLS and PCB, and a support system with openings disposed on the flat shelf.
Figure 14B:
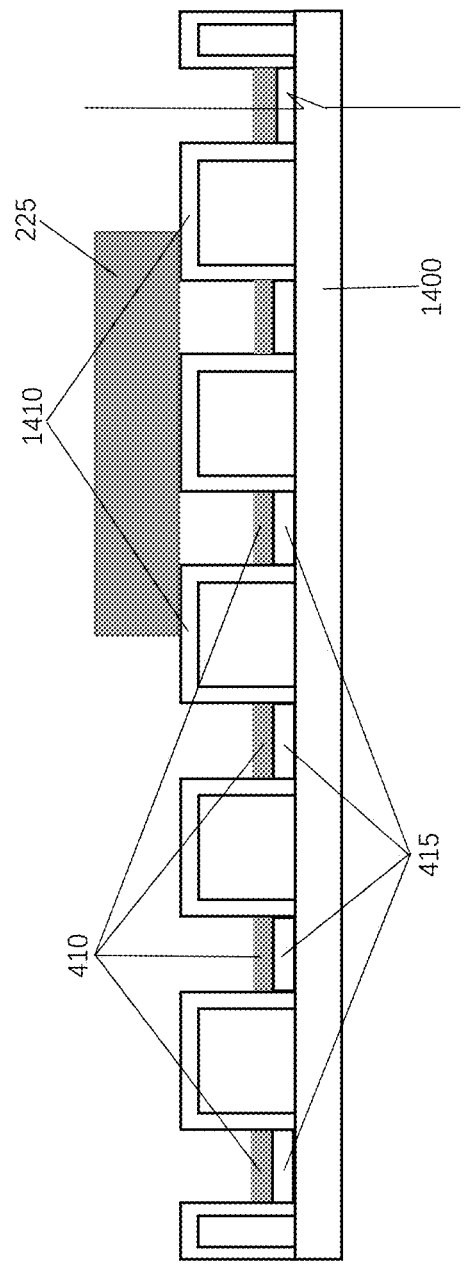
FIG. 14B shows a partial side cross-section view of a flat shelf having PLSs and PCBs, and a cover with opening-slot tracks placed on the flat shelf and the PLSs and PCBs.

FIG. 14A shows a PLSs 410 and PCB 415 placed on a flat shelf 1400. A support system 1410 that can be made of metal or other material having open-slot tracks 1410 is placed on flat shelf 1400 as a support structure for PLSs 410 and PCB 415 as can be more clearly seen in front cross-section view shown in FIG. 14B. Similar to GRS 300 and spring-pusher assembly 1100, a sensor PCB similar to 785, 930, 1030 and reader PCB similar to 786, 920, 1020 collects, records and analyzes real-time merchandise inventory data. As with the embodiments of the present disclosure set forth above in detail, a DCU of one sensor PCB and one reader PCB can be configured to fit the particular flat shelf size/design. Furthermore, the sensor PCB, the reader PCB, or together as one PCB, may be linear, sheet or in any other shape, and can be made using hard board(s) or flexible board(s).

As will be understood from the above detailed disclosure, sensor PCB 785, 930, 1030 and reader PCB 786, 920, 1020 can either be integrated as one board or two separate PCBs in accordance with the demands of the application and design. The system of the present disclosure can be implemented for either opaque or transparent merchandise by the use of proper PLSs 410 and other elements of the disclosed system and, as mentioned above, can be implemented in new shelves or can be designed as retrofits for existing shelf systems. Shelves themselves can be other than GRS, spring-pusher systems, and flat shelves and the systems can be combined in one display according to the merchandise planogram. In addition, shelves can be made of metal sheet, wire grid or other material. It will also be understood that while the specific embodiments described above show between 4 and 32 PLSs 410 being used, any number of PLSs 410 can be used and is dependent on the configuration and size of the shelves, the accuracy desired, and the type of inventory. Also, while the PLSs 410 are shown in all embodiments as being substantially evenly spaced apart, there may be instances where this is not most desirable. For example, it may be desired to have the PLSs 410 more closely space near the front of the shelves, so that an indication of the degree of low inventory is more accurate, for purposes, e.g., of restocking shelves on an "in time" basis.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A system for real-time measurement of merchandise on a shelf, said system comprising:
a shelf which comprises a top surface, a back edge and a front edge, wherein said top surface is downwardly angled from the back edge to the front edge, said top surface having disposed thereon at least one individual longitudinal track having a length and a width on which said merchandise is disposed, said individual longitudinal track being at least one selected from the group consisting of a gravity-feed roller track having rollers disposed in the width and along the length and a gravity-feed gliding track having gliding ribs disposed in the width and along the length configured to allow said merchandise on the top surface thereof to move by gravity along the downwardly angled individual longitudinal track away from the back edge and toward the front edge; and a plurality of photoresistors disposed beneath said individual longitudinal track, wherein said individual longitudinal track is disposed between said merchandise and said photoresistors, wherein ambient light is collected by said photoresistors whether or not said merchandise is disposed on said individual longitudinal track, wherein the total number of photoresistors disposed beneath said individual longitudinal track is independent of the actual number of pieces of said merchandise disposed on said individual longitudinal track, wherein the photoresistors are connected by wires to a plug and thereafter connected to a comparator, wherein, when an initial amount of said merchandise is on the individual longitudinal track, a first amount of ambient light passing through spaces between the merchandise and said individual longitudinal track is received by each of said plurality of photoresistors, wherein, when at least a portion of said initial amount of merchandise is removed from the individual longitudinal track, the remaining said merchandise on said longitudinal track moves longitudinally along the length of the individual longitudinal track via gravity with respect to the photoresistors and a second amount of ambient light is received by at least one of the photoresistors, wherein the first amount of ambient light and the second amount of ambient light collected by all of the photoresistors each produces an analog signal that is transmitted through the wires to the plug, and wherein the analog signals are converted to digital signals by the comparator and the digital signals are collected and processed in a reader and linked to a server to inchoate the percentage of said merchandise on said individual longitudinal track.

2. The system according to claim 1, wherein the plurality of photoresistors is between about 4 and about 32.

3. The system according to claim 1, wherein each of the plurality of photoresistors is disposed at a substantially equal distance from one another.

4. The system according to claim 1, wherein each of the plurality of photoresistors is disposed at a random distance from one another.

5. The system according to claim 1, wherein the plurality of photoresistors is more closely spaced near the front edge of the longitudinal track than near the back edge of the shelf.

6. The system according to claim 1, wherein the digital signal is in a base numbering system selected from the group consisting of binary, hexadecimal, octal, decimal or any combinations thereof.

7. The system according to claim 1, wherein the digital signal is converted to either an RS232 signal in the reader for wireless link to a server, or an RS485 signal in the reader for cable link to a server.

8. The system according to claim 1, wherein the digital signal is collected and processed in the reader.

9. The system according to claim 1, further comprising a protective element disposed in association with the plurality of photoresistors.

10. The system according to claim 9, wherein the protective element is made of a material that allows light to pass therethrough.

11. The system according to claim 9, wherein the protective element is made of plastic or glass.

12. The system according to claim 9, wherein each photoresistor is provided with a protective element.

13. The system according to claim 1, further comprising a printed circuit board (PCB), wherein the plurality of photoresistors is disposed on the PCB in a position selected from the group consisting of embedded in the PCB, on a top side of the PCB, on a bottom side of the PCB, on a lateral side of the PCB, or any combinations thereof.

14. The system according to claim 13, wherein the plurality of photoresistors is disposed on a top side of the PCB.

15. The system according to claim 13, wherein the PCB is of a linear or curved shape.

16. The system according to claim 13, wherein the PCB is of a thickness of from about 0.5 mm or less to 10 mm.

17. The system according to claim 13, wherein the PCB is flexible.

18. A method for real-time measurement of merchandise on a shelf, said method comprising:

(a) providing a shelf which comprises a top surface, a back edge and a front edge, wherein said top surface is downwardly angled from the back edge to the front edge, said top surface having disposed thereon at least one individual longitudinal track having a length and a width on which said merchandise is disposed, said individual longitudinal track being at least one selected from the group consisting of a gravity-feed roller track having rollers disposed in the width and along the length and a gravity-feed gliding track having gliding ribs disposed in the width and along the length configured to allow said merchandise on the top surface thereof to move by gravity along the downwardly angled individual track away from the back edge and toward the front edge;

(b) disposing a plurality of photoresistors beneath said individual longitudinal track, wherein said individual longitudinal track is disposed between said merchandise and said photoresistors, wherein ambient light is collected whether or not said merchandise is disposed on said individual longitudinal track, wherein the total number of photoresistors disposed beneath said individual longitudinal track is independent of the actual number of pieces of said merchandise disposed on said at least one individual longitudinal track, and wherein the photoresistors are connected by wires to a plug and thereafter connected to a comparator;

(c) receiving, by each of said plurality of photoresistors, a first amount of ambient light passing through spaces between the merchandise and said individual longitudinal track when an initial amount of said merchandise is on the individual longitudinal track;

(d) receiving, by at least one of said plurality of photoresistors, a second amount of ambient light when at least a portion of said initial amount of merchandise is removed from said individual longitudinal track and remaining merchandise moves longitudinally along the length of said individual longitudinal track by gravity with respect to the photoresistors; and (e) producing analog signals from the first amount of ambient light and the second amount of ambient light collected by all of the photoresistors, wherein the analog signal is transmitted through the wires to the plug; and (f) converting the analog signals to digital signals by the comparator, wherein the digital signals are collected and processed in a reader and linked to a server to indicate the percentage of said merchandise on said individual longitudinal track.

19. The method according to claim 18, wherein the plurality of photoresistors is between about 4 and about 32.

20. The method according to claim 18, wherein each of the plurality of photoresistors is disposed at a substantially equal distance from one another.

21. The method according to claim 18, wherein each of the plurality of photoresistors is disposed at a random distance from one another.

22. The method according to claim 18, wherein the plurality of photoresistors is more closely spaced on the individual longitudinal track near the front edge of the shelf than near the back edge of the shelf.

23. The method according to claim 18, wherein the digital signal is in a base numbering system selected from the group consisting of binary, hexadecimal, octal, decimal or any combinations thereof.

24. The method according to claim 18, wherein the digital signal is converted to an RS232 signal in the reader for wireless link to a server, or an RS485 signal in the reader for cable link to a server.

25. The method according to claim 18, wherein the digital signal is converted and processed in a reader.

26. The method according to claim 18, further comprising providing a protective element disposed in association with the plurality of photoresistors.

27. The method according to claim 26, wherein the protective element is made of a material that allows light to pass therethrough.

28. The method according to claim 26, wherein the protective element is made of plastic or glass.

29. The method according to claim 26, wherein each photoresistor is provided with a protective element.

30. The method according to claim 18, further comprising providing a printed circuit board (PCB) and disposing the plurality of photoresistors on the PCB in a position selected from the group consisting of embedded in the PCB, on a top side of the PCB, on a bottom side of the PCB, on a lateral side of the PCB, or any combinations thereof.

31. The method according to claim 30, wherein the plurality of photoresistors is disposed on a top side of the PCB.

32. The method according to claim 30, wherein the PCB is of a linear or curved shape.

33. The method according to claim 30, wherein the PCB is of a thickness of from about 0.5 mm or less to 10 mm.

34. The method according to claim 30, wherein the PCB is flexible.

35. A merchandise data collection device comprising:
at least one individual longitudinal track having a length and a width on which said merchandise is disposed, said individual longitudinal track being at least one selected from the group consisting of a gravity-feed roller track having rollers disposed in the width and along the length and a gravity-feed gliding track having gliding ribs disposed in the width and along the length configured to allow merchandise on a top surface thereof to move by gravity along the individual longitudinal track when the individual longitudinal track is disposed on a downwardly angled shelf element; and
a plurality of photoresistors disposed beneath said individual longitudinal track, wherein said individual longitudinal track is disposed between said merchandise and said photoresistors wherein ambient light is collected whether or not said merchandise is disposed on said individual longitudinal track, wherein the total number of photoresistors disposed beneath said individual longitudinal track is independent of the actual number of pieces of said merchandise disposed on said longitudinal track, wherein the photoresistors are connected by wires to a plug and thereafter connected to a comparator,
wherein, when an initial amount of said merchandise is on the individual longitudinal track, a first amount of ambient light passing through spaces between the merchandise and said individual longitudinal track is received by each of said plurality of photoresistors,
wherein, when at least a portion of said initial amount of merchandise is removed from the individual longitudinal track, the remaining said merchandise on said longitudinal track moves longitudinally along the length of the individual longitudinal track via gravity with respect to the photoresistors and a second amount of ambient light is received by at least one of the photoresistors,
wherein the first amount of ambient light and the second amount of ambient light collected by all of the photoresistors each produces an analog signal that is transmitted through the wires to the plug, and
wherein the analog signals are converted to digital signals by the comparator and the digital signals are collected and processed in a reader and linked to a server to indicate the percentage of said merchandise on said individual longitudinal track.

* * * * *